(12) United States Patent
Lin et al.

(10) Patent No.: US 12,449,641 B2
(45) Date of Patent: Oct. 21, 2025

(54) OPTICAL IMAGING LENS SYSTEM, IMAGE CAPTURING UNIT AND ELECTRONIC DEVICE INCLUDING SIX LENSES OF ++-++- OR ++-+- REFRACTIVE POWERS

(71) Applicant: LARGAN PRECISION CO., LTD., Taichung (TW)

(72) Inventors: Yu Jui Lin, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 615 days.

(21) Appl. No.: 17/866,534

(22) Filed: Jul. 17, 2022

(65) Prior Publication Data

US 2023/0324654 A1    Oct. 12, 2023

Related U.S. Application Data

(60) Provisional application No. 63/328,056, filed on Apr. 6, 2022.

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC .... G02B 13/0045; G02B 13/02; G02B 13/06; G02B 9/62; G02B 3/0037; G02B 30/00
See application file for complete search history.

(56) References Cited

U.S. PATENT DOCUMENTS

| | | |
|---|---|---|
| 2012/0314304 A1 | 12/2012 | Huang |
| 2014/0078603 A1 | 3/2014 | You |
| 2015/0015765 A1 | 1/2015 | Lee |
| 2015/0109684 A1 | 4/2015 | Son |

(Continued)

FOREIGN PATENT DOCUMENTS

| | | |
|---|---|---|
| CN | 106405794 A | 2/2017 |
| CN | 111123475 A | 5/2020 |

(Continued)

OTHER PUBLICATIONS

Indian Examination Report dated Jul. 29, 2025 as received in application No. 202334025560.

*Primary Examiner* — Wen Huang
(74) *Attorney, Agent, or Firm* — Maschoff Brennan

(57) ABSTRACT

An optical imaging lens system includes a first lens element, a second lens element, a third lens element, a fourth lens element, a fifth lens element and a sixth lens element in order from an object side to an image side along an optical path. The first lens element has positive refractive power. The second lens element with positive refractive power has an image-side surface being convex in a paraxial region thereof. The fourth lens element has an object-side surface being concave in a paraxial region thereof and an image-side surface being convex in a paraxial region thereof. The fifth lens element has an image-side surface being convex in a paraxial region thereof. The sixth lens element with negative refractive power has an object-side surface being convex in a paraxial region thereof and an image-side surface being concave in a paraxial region thereof and having an inflection point.

25 Claims, 22 Drawing Sheets

(56) References Cited

U.S. PATENT DOCUMENTS

| | | |
|---|---|---|
| 2015/0338614 A1 | 11/2015 | Tang et al. |
| 2016/0004050 A1 | 1/2016 | Tang et al. |
| 2016/0018629 A1 | 1/2016 | Tang et al. |
| 2016/0124184 A1 | 5/2016 | Tang et al. |
| 2016/0124186 A1 | 5/2016 | Tang et al. |
| 2016/0341929 A1 | 11/2016 | Liu et al. |
| 2016/0341931 A1 | 11/2016 | Liu et al. |
| 2017/0045717 A1 | 2/2017 | Park |
| 2018/0039046 A1 | 2/2018 | Lee et al. |
| 2018/0074290 A1 | 3/2018 | Chang |
| 2018/0143405 A1 | 5/2018 | Hsueh et al. |
| 2019/0121081 A1 | 4/2019 | Huang |
| 2020/0150391 A1 | 5/2020 | Hsueh et al. |
| 2021/0063694 A1 | 3/2021 | Li et al. |
| 2021/0333514 A1 | 10/2021 | Zhou et al. |
| 2022/0003964 A1* | 1/2022 | Xie ................. G02B 9/64 |
| 2022/0050274 A1 | 2/2022 | Tang |

FOREIGN PATENT DOCUMENTS

| | | |
|---|---|---|
| CN | 111175933 A | 5/2020 |
| CN | 111175934 A | 5/2020 |
| CN | 111413787 A | 7/2020 |
| CN | 111427131 A | 7/2020 |
| CN | 111781710 A | 10/2020 |
| CN | 211741695 U | 10/2020 |
| CN | 211905833 U | 11/2020 |
| CN | 112505887 A | 3/2021 |
| CN | 112684581 A | 4/2021 |
| CN | 214174726 U | 9/2021 |
| CN | 113589491 A | 11/2021 |
| WO | 2015060166 A1 | 4/2015 |
| WO | 2019066251 A1 | 4/2019 |
| WO | 2021128306 A1 | 7/2021 |
| WO | 2021223562 A1 | 11/2021 |
| WO | 2022033326 A1 | 2/2022 |

* cited by examiner

OPTICAL IMAGING LENS SYSTEM, IMAGE CAPTURING UNIT AND ELECTRONIC DEVICE INCLUDING SIX LENSES OF ++−++− OR ++−+− REFRACTIVE POWERS

RELATED APPLICATIONS

This application claims priority to U.S. Provisional Application 63/328,056, filed on Apr. 6, 2022, which is incorporated by reference herein in its entirety.

BACKGROUND

Technical Field

The present disclosure relates to an optical imaging lens system, an image capturing unit and an electronic device, more particularly to an optical imaging lens system and an image capturing unit applicable to an electronic device.

Description of Related Art

With the development of semiconductor manufacturing technology, the performance of image sensors has improved, and the pixel size thereof has been scaled down. Therefore, featuring high image quality becomes one of the indispensable features of an optical system nowadays.

Furthermore, due to the rapid changes in technology, electronic devices equipped with optical systems are trending towards multi-functionality for various applications, and therefore the functionality requirements for the optical systems have been increasing. However, it is difficult for a conventional optical system to obtain a balance among the requirements such as high image quality, low sensitivity, a proper aperture size, miniaturization and a desirable field of view.

SUMMARY

According to one aspect of the present disclosure, an optical imaging lens system includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The second lens element has positive refractive power, and the image-side surface of the second lens element is convex in a paraxial region thereof. The object-side surface of the fourth lens element is concave in a paraxial region thereof, and the image-side surface of the fourth lens element is convex in a paraxial region thereof. The image-side surface of the fifth lens element is convex in a paraxial region thereof. The sixth lens element has negative refractive power, the object-side surface of the sixth lens element is convex in a paraxial region thereof, the image-side surface of the sixth lens element is concave in a paraxial region thereof, and the image-side surface of the sixth lens element has at least one inflection point.

When a focal length of the first lens element is f1, a focal length of the fourth lens element is f4, a focal length of the fifth lens element is f5, an axial distance between the first lens element and the second lens element is T12, an axial distance between the fifth lens element and the sixth lens element is T56, a curvature radius of the object-side surface of the fifth lens element is R9, and a curvature radius of the image-side surface of the fifth lens element is R10, the following conditions are satisfied:

$$0 \leq |f1/f4| < 0.65;$$

$$0 \leq |f5/f4| < 0.80;$$

$$0.70 < T12/T56 < 6.50; \text{ and}$$

$$(R9+R10)/(R9-R10) < 2.50.$$

According to another aspect of the present disclosure, an optical imaging lens system includes six lens elements. The six lens elements are, in order from an object side to an image side along an optical path, a first lens element, a second lens element, a third lens element, a fourth lens element, a fifth lens element and a sixth lens element. Each of the six lens elements has an object-side surface facing toward the object side and an image-side surface facing toward the image side.

The first lens element has positive refractive power. The object-side surface of the fourth lens element is concave in a paraxial region thereof. The fifth lens element has positive refractive power. The object-side surface of the sixth lens element is convex in a paraxial region thereof, the image-side surface of the sixth lens element is concave in a paraxial region thereof, and the image-side surface of the sixth lens element has at least one inflection point.

When a focal length of the first lens element is f1, a focal length of the fourth lens element is f4, an axial distance between the third lens element and the fourth lens element is T34, a central thickness of the second lens element is CT2, a central thickness of the fourth lens element is CT4, a central thickness of the fifth lens element is CT5, an Abbe number of the second lens element is V2, an Abbe number of the third lens element is V3, and an Abbe number of the sixth lens element is V6, the following conditions are satisfied:

$$0 \leq |f1/f4| < 0.60;$$

$$0.60 < T34/CT2 < 5.0;$$

$$0.15 < (V3+V6)/V2 < 1.25; \text{ and}$$

$$0.90 < CT5/CT4 < 2.50.$$

According to another aspect of the present disclosure, an image capturing unit includes one of the aforementioned optical imaging lens systems and an image sensor, wherein the image sensor is disposed on an image surface of the optical imaging lens system.

According to another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens system includes six lens elements. The six lens elements are, in order from an object side to an image side along an optical path, a first lens element, a second lens element, a third lens element, a fourth lens element, a fifth lens element and a sixth lens element. Each of the six lens elements of the optical imaging lens system has an object-side surface facing toward the object side and an image-side surface facing toward the image side.

The first lens element has positive refractive power. Therefore, it is favorable for providing significant light converging capability so as to reduce the size of the optical imaging lens system, thereby achieving compactness. The object-side surface of the first lens element can be convex in a paraxial region thereof. Therefore, it is favorable for reducing the incident angle in the off-axis region on the first lens element so as to prevent total reflection.

The second lens element can have positive refractive power. Therefore, it is favorable for distributing the refractive power of the first lens element so as to prevent the refractive power of a single lens element from being overly strong, thereby reducing spherical aberration. The image-side surface of the second lens element can be convex in a paraxial region thereof. Therefore, it is favorable for capturing light with a large angle of view so as to increase the imaging range.

The third lens element can have negative refractive power. Therefore, it is favorable for correcting chromatic aberration. The image-side surface of the third lens element can be concave in a paraxial region thereof. Therefore, it is favorable for balancing the light convergence of different wavelengths.

The object-side surface of the fourth lens element is concave in a paraxial region thereof, and the image-side surface of the fourth lens element can be convex in a paraxial region thereof. Therefore, it is favorable for correcting astigmatism and coma.

The fifth lens element can have positive refractive power. Therefore, it is favorable for controlling the back focal length of the optical imaging lens system so as to reduce the total track length. The image-side surface of the fifth lens element can be convex in a paraxial region thereof. Therefore, it is favorable for reducing the total track length of the optical imaging lens system so as to achieve compactness.

Figure 17:
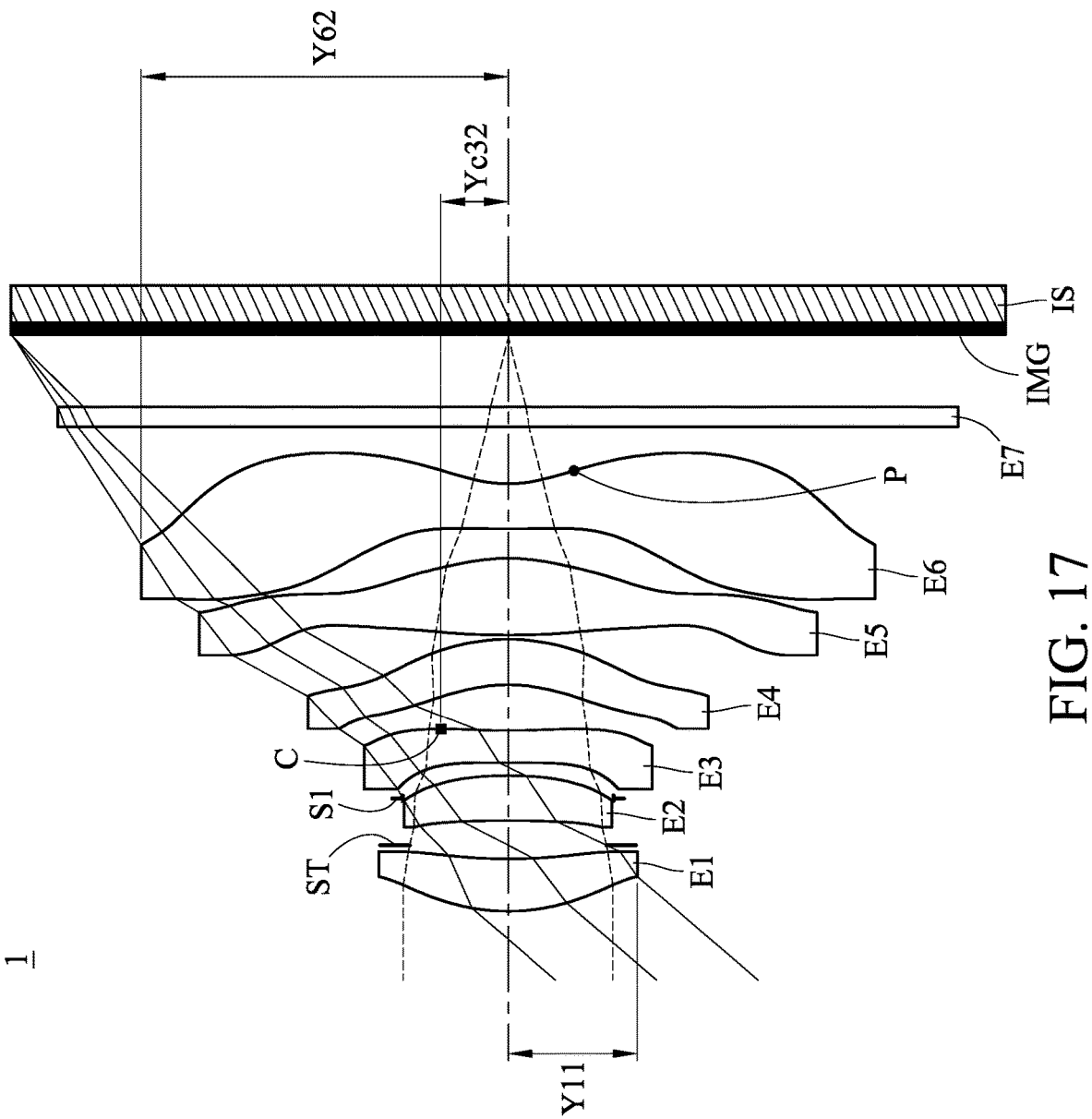
FIG. 17 shows a schematic view of Y11, Yc32, Y62, some inflection points and critical points of some lens elements according to the 1st embodiment of the present disclosure.

The sixth lens element can have negative refractive power. Therefore, it is favorable for balancing focusing positions in the paraxial and off-axis regions so as to correct field curvature. The object-side surface of the sixth lens element is convex in a paraxial region thereof, and the image-side surface of the sixth lens element is concave in a paraxial region thereof. Therefore, it is favorable for controlling the light paths in the paraxial and off-axis regions so as to correct aberrations. In addition, the image-side surface of the sixth lens element has at least one inflection point. Therefore, it is favorable for reducing distortion. Please refer to FIG. 17, which shows a schematic view of one inflection point P of the image-side surface of the sixth lens element E6 according to the 1st embodiment of the present disclosure. The inflection point P of the image-side surface of the sixth lens element E6 in FIG. 17 is only exemplary. Each of the lens elements in various embodiments of the present disclosure can have one or more inflection points.

When a focal length of the first lens element is f1, and a focal length of the fourth lens element is f4, the following condition is satisfied: $0 \leq |f1/f4| < 0.65$. Therefore, it is favorable for balancing the refractive power of the first lens element and that of the fourth lens element, so that the first lens element works as a main control lens and the fourth lens element works as a correction lens so as to balance images. Moreover, the following condition can also be satisfied: $0 \leq |f1/f4| < 0.60$. Moreover, the following condition can also be satisfied: $0 \leq |f1/f4| < 0.45$. Moreover, the following condition can also be satisfied: $0 \leq |f1/f4| < 0.25$.

When the focal length of the fourth lens element is f4, and a focal length of the fifth lens element is f5, the following condition can be satisfied: $0 \leq |f5/f4| < 0.80$. Therefore, it is favorable for balancing the refractive power of the fifth lens element and that of the fourth lens element, so that the fifth lens element works as a main control lens and the fourth lens element works as a correction lens so as to balance images. Moreover, the following condition can also be satisfied: $0 \leq |f5/f4| < 0.50$. Moreover, the following condition can also be satisfied: $0 \leq |f5/f4| < 0.20$.

When an axial distance between the first lens element and the second lens element is T12, and an axial distance between the fifth lens element and the sixth lens element is T56, the following condition can be satisfied: $0.70<T12/T56<6.50$.

Therefore, it is favorable for balancing the space arrangement between the lens elements at the object side and the lens elements at the image side of the optical imaging lens system so as to improve manufacturing yields. Moreover, the following condition can also be satisfied: $0.80<T12/T56<3.50$. Moreover, the following condition can also be satisfied: $0.90<T12/T56<2.50$.

When a curvature radius of the object-side surface of the fifth lens element is R9, and a curvature radius of the image-side surface of the fifth lens element is R10, the following condition can be satisfied: $(R9+R10)/(R9-R10)<2.50$. Therefore, it is favorable for ensuring that the fifth lens element has sufficient refractive power and obtaining a balance between the shapes of the fifth lens element and the sixth lens element. Moreover, the following condition can also be satisfied: $0<(R9+R10)/(R9-R10)<1.50$.

When an axial distance between the third lens element and the fourth lens element is T34, and a central thickness of the second lens element is CT2, the following condition can be satisfied: $0.60<T34/CT2<5.0$. Therefore, it is favorable for balancing the thickness of lens element and the distance between lens elements so as to facilitate lens assembly and prevent mechanical interferences.

When an Abbe number of the second lens element is V2, an Abbe number of the third lens element is V3, and an Abbe number of the sixth lens element is V6, the following condition can be satisfied: $0.15<(V3+V6)V2<1.25$. Therefore, it is favorable for balancing the material arrangement of lens elements in the optical imaging lens system so as to improve light modulating abilities of the lens elements. Moreover, the following condition can also be satisfied: $0.40<(V3+V6)V2<1.20$. Moreover, the following condition can also be satisfied: $0.80<(V3+V6)V2<1.10$.

When a central thickness of the fourth lens element is CT4, and a central thickness of the fifth lens element is CT5, the following condition can be satisfied: $0.90<CT5/CT4<2.50$. Therefore, it is favorable for ensuring the thickness ratio between the fourth lens element and the fifth lens element so as to improve the lens molding quality and prevent warping and birefringence.

When the Abbe number of the third lens element is V3, and an Abbe number of the fourth lens element is V4, the following condition can be satisfied: $15.0<V3+V4<50.0$. Therefore, it is favorable for correcting chromatic aberration so as to improve image sharpness.

When the Abbe number of the sixth lens element is V6, the following condition can be satisfied: $30.0<V6<42.0$. Therefore, it is favorable for balancing the chromatic aberration throughout the optical imaging lens system. Moreover, the following condition can also be satisfied: $33.0<V6<40.0$.

When an axial distance between the object-side surface of the first lens element and an image surface is TL, and a maximum image height of the optical imaging lens system (which can be half of a diagonal length of an effective photosensitive area of an image sensor) is ImgH, the following condition can be satisfied: $0.50<TL/ImgH<1.55$. Therefore, it is favorable for reducing the total track length of the optical imaging lens system and increasing light receiving area of the image sensor. Moreover, the following condition can also be satisfied: $0.70<TL/ImgH<1.35$. Moreover, the following condition can also be satisfied: $0.90<TL/ImgH<1.20$.

When a curvature radius of the object-side surface of the first lens element is R1, and a curvature radius of the image-side surface of the first lens element is R2, the following condition can be satisfied: $-0.80<(R1-R2)/(R1+R2)<0$. Therefore, it is favorable for balancing the light path in both tangential direction and sagittal direction so as to improve image quality. Moreover, the following condition can also be satisfied: $-0.60<(R1-R2)/(R1+R2)<-0.20$.

When a curvature radius of the object-side surface of the second lens element is R3, and a curvature radius of the image-side surface of the second lens element is R4, the following condition can be satisfied: $0.30<(R3-R4)/(R3+R4)<0.80$. Therefore, it is favorable for the second lens element to be symmetrical to the first lens element in shape so as to improve image quality. Moreover, the following condition can also be satisfied: $0.40<(R3-R4)/(R3+R4)<0.70$. When a focal length of the optical imaging lens system is f, and the focal length of the fourth lens element is f4, the following condition can be satisfied: $-0.50<f/f4<0.30$. Therefore, it is favorable for the fourth lens element to be a correction lens so as to correct off-axis aberrations. Moreover, the following condition can also be satisfied: $-0.20<f/f4<0.20$.

When the axial distance between the first lens element and the second lens element is T12, and a maximum value among central thicknesses of all lens elements of the optical imaging lens system is CTmax, the following condition can be satisfied: $0.30<T12/CTmax<1.0$. Therefore, it is favorable for maintaining the axial distance between the first lens element and the second lens element so as to adjust the refraction angle of light in the optical imaging lens system. Moreover, the following condition can also be satisfied: $0.40<T12/CTmax<0.80$.

According to the present disclosure, the optical imaging lens system further includes an aperture stop. When an axial distance between the aperture stop and the image-side surface of the sixth lens element is SD, and an axial distance between the object-side surface of the first lens element and the image-side surface of the sixth lens element is TD, the following condition can be satisfied: $0.75<SD/TD<0.90$. Therefore, it is favorable for controlling the position of the aperture stop so as to balance the total track length and the field of view of the optical imaging lens system.

Figure 18:
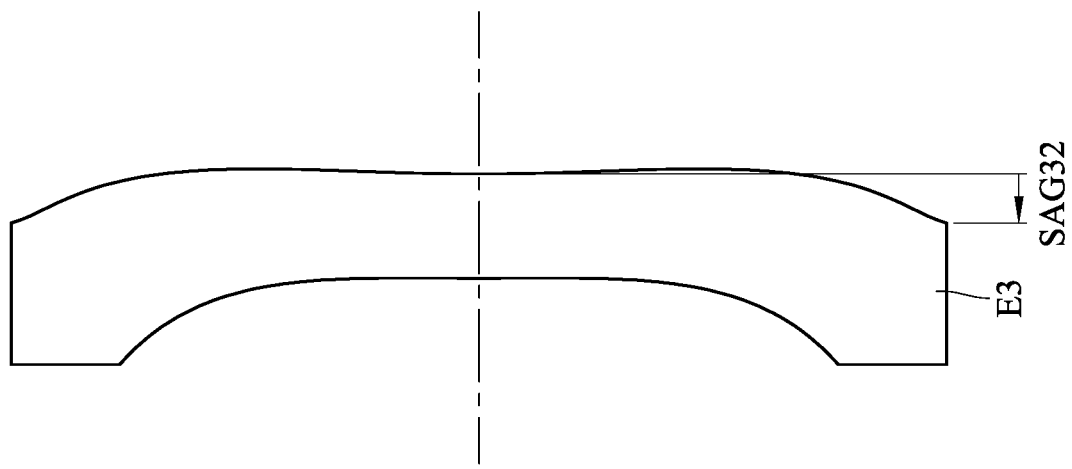
FIG. 18 shows a schematic view of SAG32 and the third lens element according to the 1st embodiment of the present disclosure.

When a displacement in parallel with an optical axis from an axial vertex of the image-side surface of the third lens element to a maximum effective radius position of the image-side surface of the third lens element is SAG32, and the axial distance between the first lens element and the second lens element is T12, the following condition can be satisfied: $-0.80<SAG32/T12<0$. Therefore, it is favorable for controlling the shape in the off-axis region of the third lens element so as to gather light with a large angle of view, Moreover, the following condition can also be satisfied: $-0.60<SAG32/T12<-0.20$. Please refer to FIG. 18, which shows a schematic view of SAG32 and the third lens element E3 according to the 1st embodiment of the present disclosure. When the direction from the axial vertex of one surface to the maximum effective radius position of the same surface is facing towards the image side of the optical imaging lens system, the value of displacement is positive; when the direction from the axial vertex of the surface to the maximum effective radius position of the same surface is facing towards the object side of the optical imaging lens system, the value of displacement is negative.

When a minimum value among Abbe numbers of all lens elements of the optical imaging lens system is Vmin, the following condition can be satisfied: 5.0<Vmin<21.0. Therefore, it is favorable for enhancing the light refractive capability of the optical imaging lens system so as to achieve compactness. Moreover, the following condition can also be satisfied: 5.0<Vmin<20.0.

According to the present disclosure, the aperture stop can be disposed between the first lens element and the second lens element. Therefore, it is favorable for balancing the size of the optical imaging lens system and the incident angle of light on the image sensor so as to prevent vignetting in the peripheral region of the image.

When a curvature radius of the object-side surface of the fourth lens element is R7, and a curvature radius of the image-side surface of the fourth lens element is R8, the following condition can be satisfied: −0.50<(R7−R8)/(R7+R8)<0.50. Therefore, it is favorable for correcting paraxial and off-axis aberrations generated by the first lens element, the second lens element and third lens element. Moreover, the following condition can also be satisfied: −0.20<(R7−R8)/(R7+R8)<0.20.

When a vertical distance between a critical point on the image-side surface of the third lens element and the optical axis is Yc32, and the focal length of the optical imaging lens system is f, the following condition can be satisfied: 0.05<Yc32/f<0.80. Therefore, it is favorable for reducing the total track length and correcting off-axis aberrations. Moreover, the following condition can also be satisfied: 0.05<Yc32/f<0.30. Please refer to FIG. 17, which shows a schematic view of Yc32 and the non-axial critical point C of the image-side surface of the third lens element E3 according to the 1st embodiment of the present disclosure. The non-axial critical point C of the image-side surface of the third lens element E3 in FIG. 17 is only exemplary. Each of the lens elements in various embodiments of the present disclosure can have one or more non-axial critical points.

When the axial distance between the object-side surface of the first lens element and the image surface is TL, and the focal length of the optical imaging lens system is f, the following condition can be satisfied: 1.10<TL/f<1.60. Therefore, it is favorable for balancing the total track length and the focal length of the optical imaging lens system so as to obtain a compact and wide angle configuration. Moreover, the following condition can also be satisfied: 1.20<TL/f<1.50.

When the axial distance between the object-side surface of the first lens element and the image surface is TL, the following condition can be satisfied: 3.0 mm<TL<6.0 mm. Therefore, it is favorable for controlling the total track length of the optical imaging lens system so as to prevent the device size from being overly large. Moreover, the following condition can also be satisfied: 4.0 mm<TL<4.50 mm.

When an f-number of the optical imaging lens system is Fno, the following condition can be satisfied: 1.70<Fno<2.20. Therefore, it is favorable for controlling the amount of incident light so as to prevent vignetting in the peripheral region of the image.

When half of a maximum field of view of the optical imaging lens system is HFOV, the following condition can be satisfied: 40.0 degrees<HFOV<60.0 degrees. Therefore, it is favorable for increasing the viewing angle for various applications.

Figure 19:
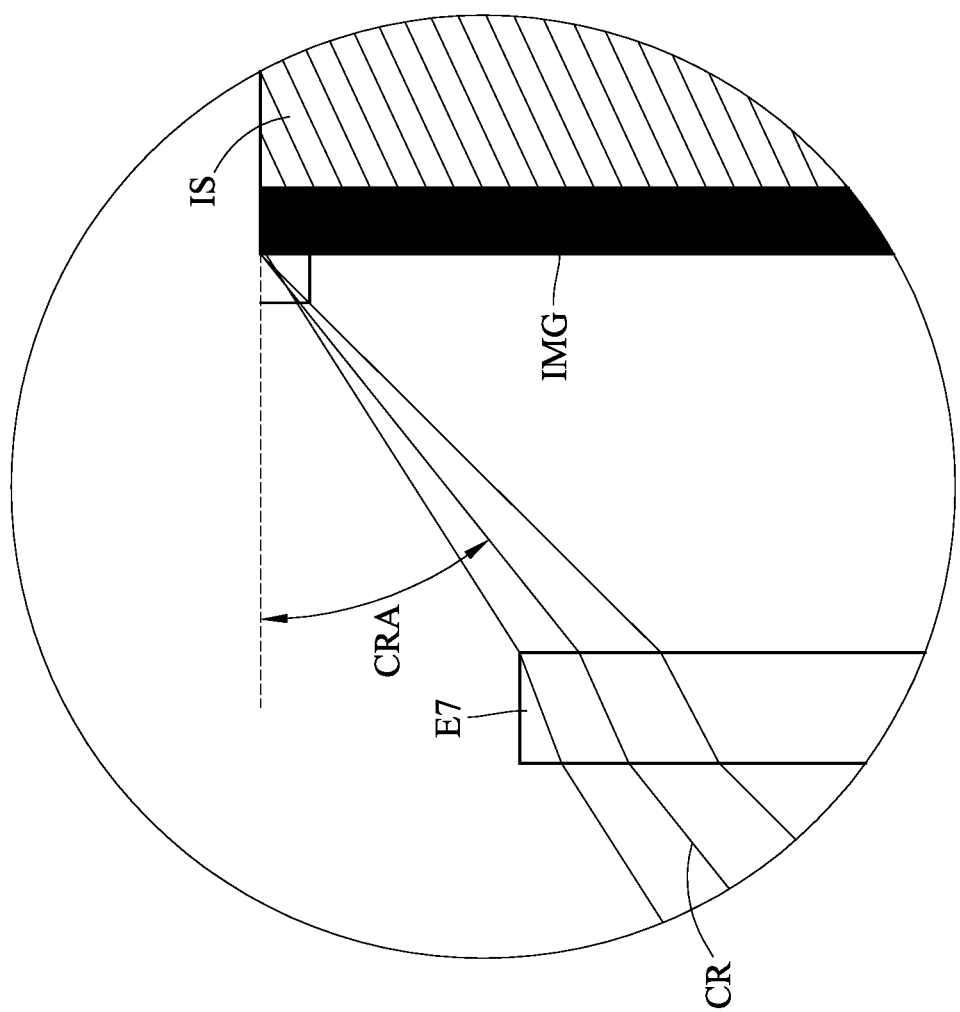
FIG. 19 a schematic view of CRA according to the 1st embodiment of the present disclosure.

When a maximum value among all chief ray angles on the image surface of the optical imaging lens system is CRAmax, the following condition can be satisfied: 35.0 degrees<CRAmax<50.0 degrees. Therefore, it is favorable for reducing the back focal length and the total track length so as to meet the requirement of compactness. Moreover, the following condition can also be satisfied: 37.0 degrees<CRAmax<48.0 degrees. Please refer to FIG. 19, which shows a schematic view of a chief ray angle CRA according to the 1st embodiment of the present disclosure. In FIG. 19, a chief ray CR is projected on the image surface IMG at an image position, and the angle between a normal line of the image surface IMG and the chief ray CR is CRA. Each of chief rays CR incident on the image surface IMG at different image positions respectively corresponds to each of different chief ray angles CRA, and the maximum value among the chief ray angles CRA is CRAmax.

When a maximum effective radius of the object-side surface of the first lens element is Y11, and a maximum effective radius of the image-side surface of the sixth lens element is Y62, the following condition can be satisfied: 0.10<Y11/Y62<0.50. Therefore, it is favorable for controlling the size of the lens elements at the object side and the image side of the optical imaging lens system so as to achieve larger imaging range and provide good appearance of the device. Moreover, the following condition can also be satisfied: 0.25<Y11/Y62<0.40. Please refer to FIG. 17, which shows a schematic view of Y11 and Y62 according to the 1st embodiment of the present disclosure.

According to the present disclosure, the aforementioned features and conditions can be utilized in numerous combinations so as to achieve corresponding effects.

According to the present disclosure, the lens elements of the optical imaging lens system can be made of either glass or plastic material. When the lens elements are made of glass material, the refractive power distribution of the optical imaging lens system may be more flexible, and the influence on imaging caused by external environment temperature change may be reduced. The glass lens element can either be made by grinding or molding. When the lens elements are made of plastic material, the manufacturing costs can be effectively reduced.

Furthermore, surfaces of each lens element can be arranged to be spherical or aspheric. Spherical lens elements are simple in manufacture. Aspheric lens element design allows more control variables for eliminating aberrations thereof and reducing the required number of lens elements, and the total track length of the optical imaging lens system can therefore be effectively shortened. Additionally, the aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the lens elements' material may optionally include an additive which generates light absorption and interference effects and alters the lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material lens element by injection molding. Moreover, the additive may be coated on the lens surfaces to provide the abovementioned effects.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa. A critical point is a non-axial point of the lens surface where its tangent is perpendicular to the optical axis.

According to the present disclosure, the image surface of the optical imaging lens system, based on the corresponding image sensor, can be flat or curved, especially a curved surface being concave facing towards the object side of the optical imaging lens system.

According to the present disclosure, an image correction unit, such as a field flattener, can be optionally disposed between the lens element closest to the image side of the optical imaging lens system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the image capturing unit. In general, a preferable image correction unit is, for example, a thin transparent element having a concave object-side surface and a planar image-side surface, and the thin transparent element is disposed near the image surface.

Figure 20:
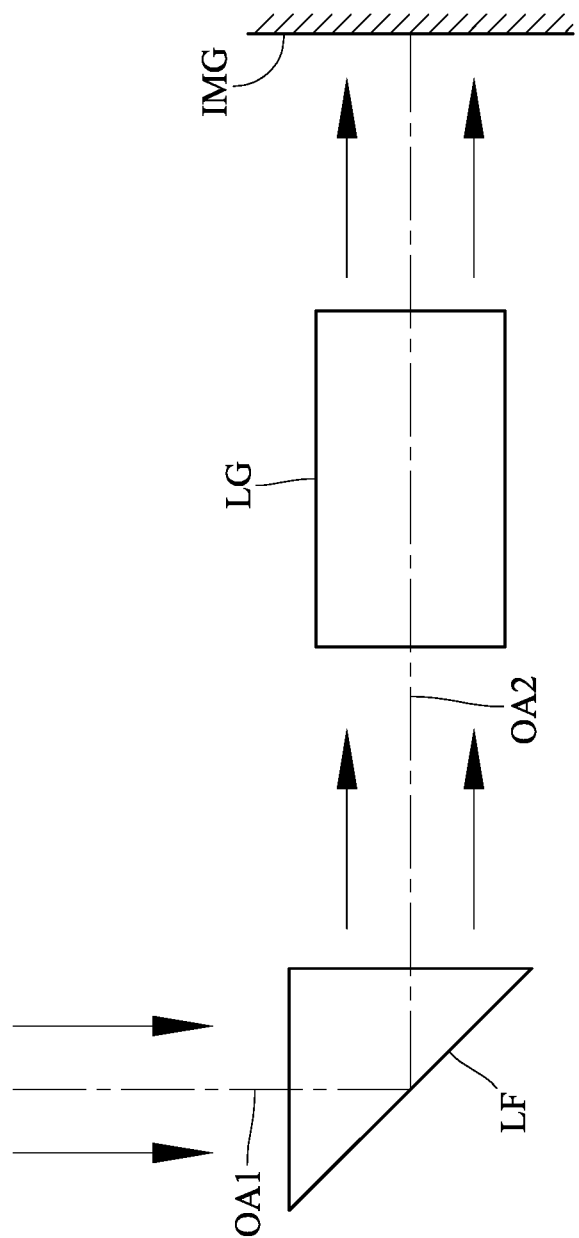
FIG. 20 shows a schematic view of a configuration of one light-folding element in an optical imaging lens system according to one embodiment of the present disclosure.
Figure 21:
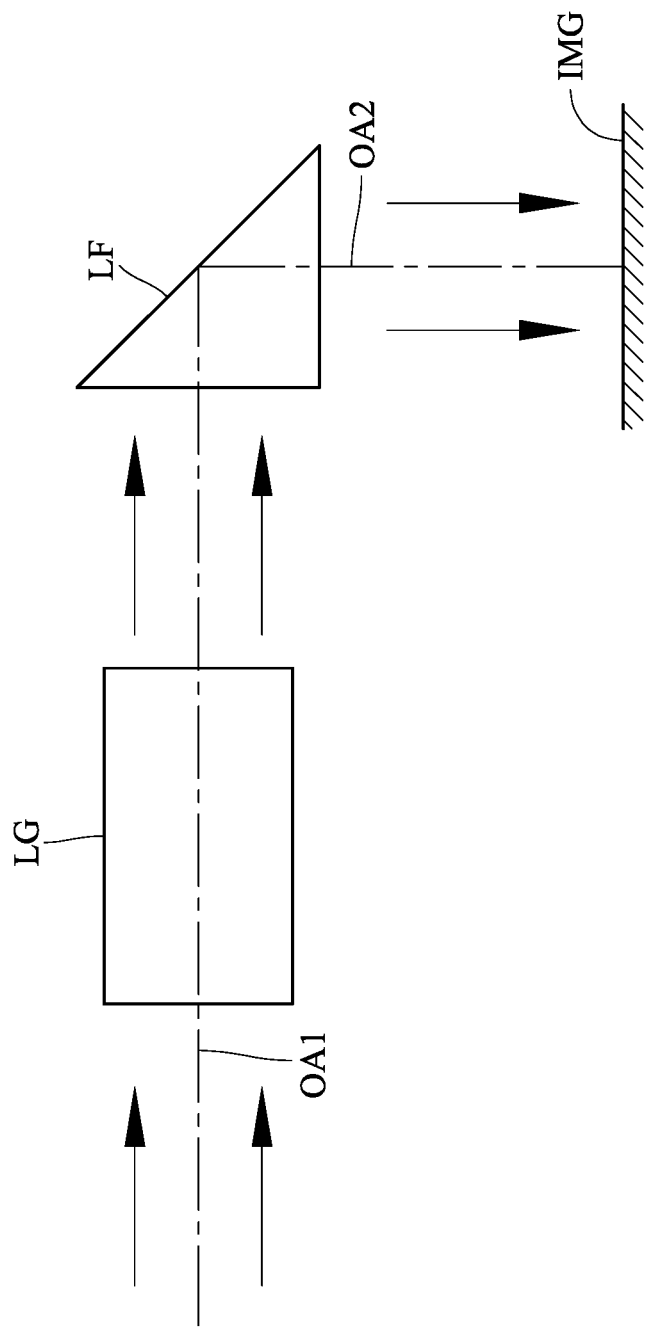
FIG. 21 shows a schematic view of another configuration of one light-folding element in an optical imaging lens system according to one embodiment of the present disclosure.
Figure 22:
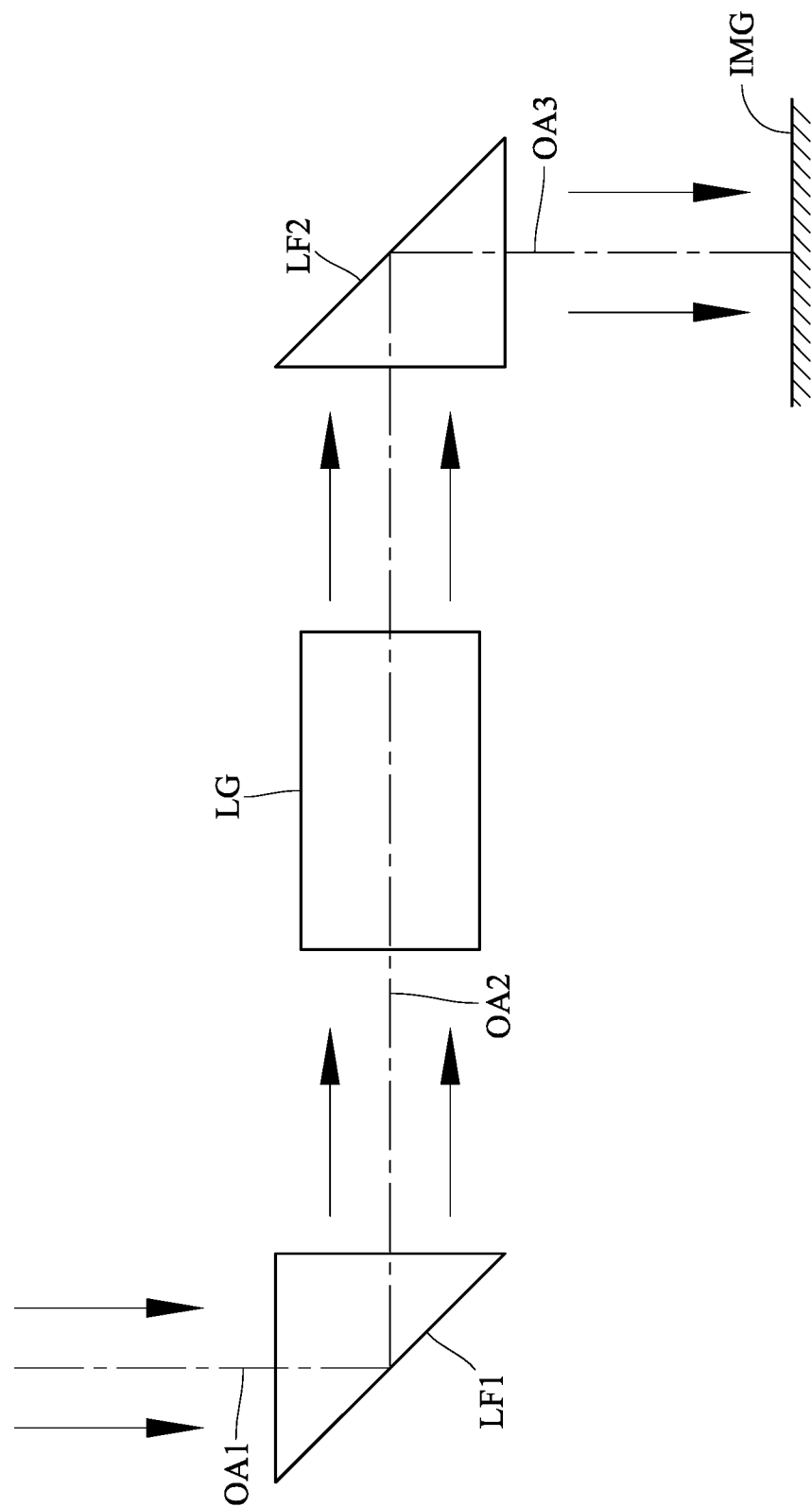
FIG. 22 shows a schematic view of a configuration of two light-folding elements in an optical imaging lens system according to one embodiment of the present disclosure.

According to the present disclosure, at least one light-folding element, such as a prism or a mirror, can be optionally disposed between an imaged object and the image surface on the imaging optical path, such that the optical imaging lens system can be more flexible in space arrangement, and therefore the dimensions of an electronic device is not restricted by the total track length of the optical imaging lens system. Specifically, please refer to FIG. 20 and FIG. 21. FIG. 20 shows a schematic view of a configuration of a light-folding element in an optical imaging lens system according to one embodiment of the present disclosure, and FIG. 21 shows a schematic view of another configuration of a light-folding element in an optical imaging lens system according to one embodiment of the present disclosure. In FIG. 20 and FIG. 21, the optical imaging lens system can have, in order from an imaged object (not shown in the figures) to an image surface IMG along an optical path, a first optical axis OA1, a light-folding element LF and a second optical axis OA2. The light-folding element LF can be disposed between the imaged object and a lens group LG of the optical imaging lens system as shown in FIG. 20 or disposed between a lens group LG of the optical imaging lens system and the image surface IMG as shown in FIG. 21. Furthermore, please refer to FIG. 22, which shows a schematic view of a configuration of two light-folding elements in an optical imaging lens system according to one embodiment of the present disclosure. In FIG. 22, the optical imaging lens system can have, in order from an imaged object (not shown in the figure) to an image surface IMG along an optical path, a first optical axis OA1, a first light-folding element LF1, a second optical axis OA2, a second light-folding element LF2 and a third optical axis OA3. The first light-folding element LF1 is disposed between the imaged object and a lens group LG of the optical imaging lens system, the second light-folding element LF2 is disposed between the lens group LG of the optical imaging lens system and the image surface IMG, and the travelling direction of light on the first optical axis OA1 can be the same direction as the travelling direction of light on the third optical axis OA3 as shown in FIG. 22. The optical imaging lens system can be optionally provided with three or more light-folding elements, and the present disclosure is not limited to the type, amount and position of the light-folding elements of the embodiments disclosed in the aforementioned figures.

According to the present disclosure, the optical imaging lens system can include at least one stop, such as an aperture stop, a glare stop or a field stop. Said glare stop or said field stop is set for eliminating the stray light and thereby improving image quality thereof.

According to the present disclosure, an aperture stop can be configured as a front stop or a middle stop. A front stop disposed between an imaged object and the first lens element can provide a longer distance between an exit pupil of the optical imaging lens system and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens system and thereby provides a wider field of view for the same.

According to the present disclosure, the optical imaging lens system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the optical imaging lens system can include one or more optical elements for limiting the form of light passing through the optical imaging lens system. Each optical element can be, but not limited to, a filter, a polarizer, etc., and each optical element can be, but not limited to, a single-piece element, a composite component, a thin film, etc. The optical element can be located at the front side or the rear side of the optical imaging lens system or between any two adjacent lens elements so as to allow light in a specific form to pass through, thereby meeting application requirements.

According to the above description of the present disclosure, the following specific embodiments are provided for further explanation.

1st Embodiment

Figure 1:
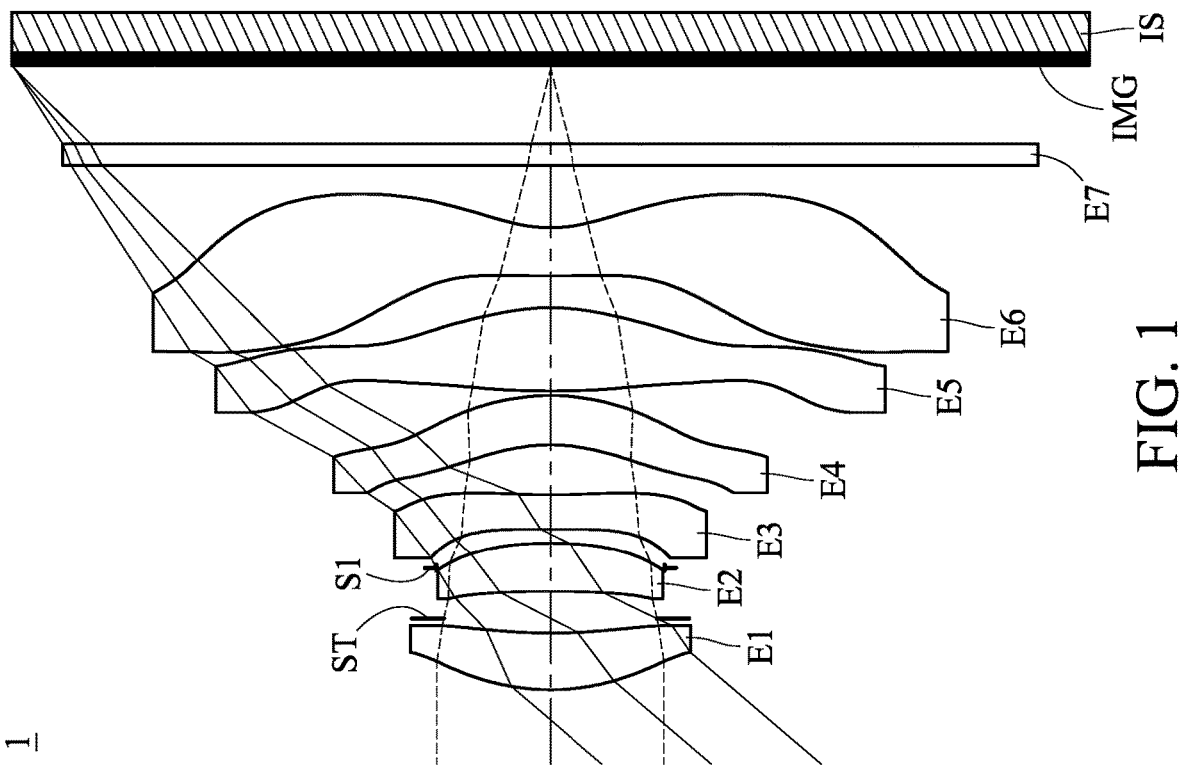
FIG. 1 is a schematic view of an image capturing unit according to the 1st embodiment of the present disclosure.
Figure 2:
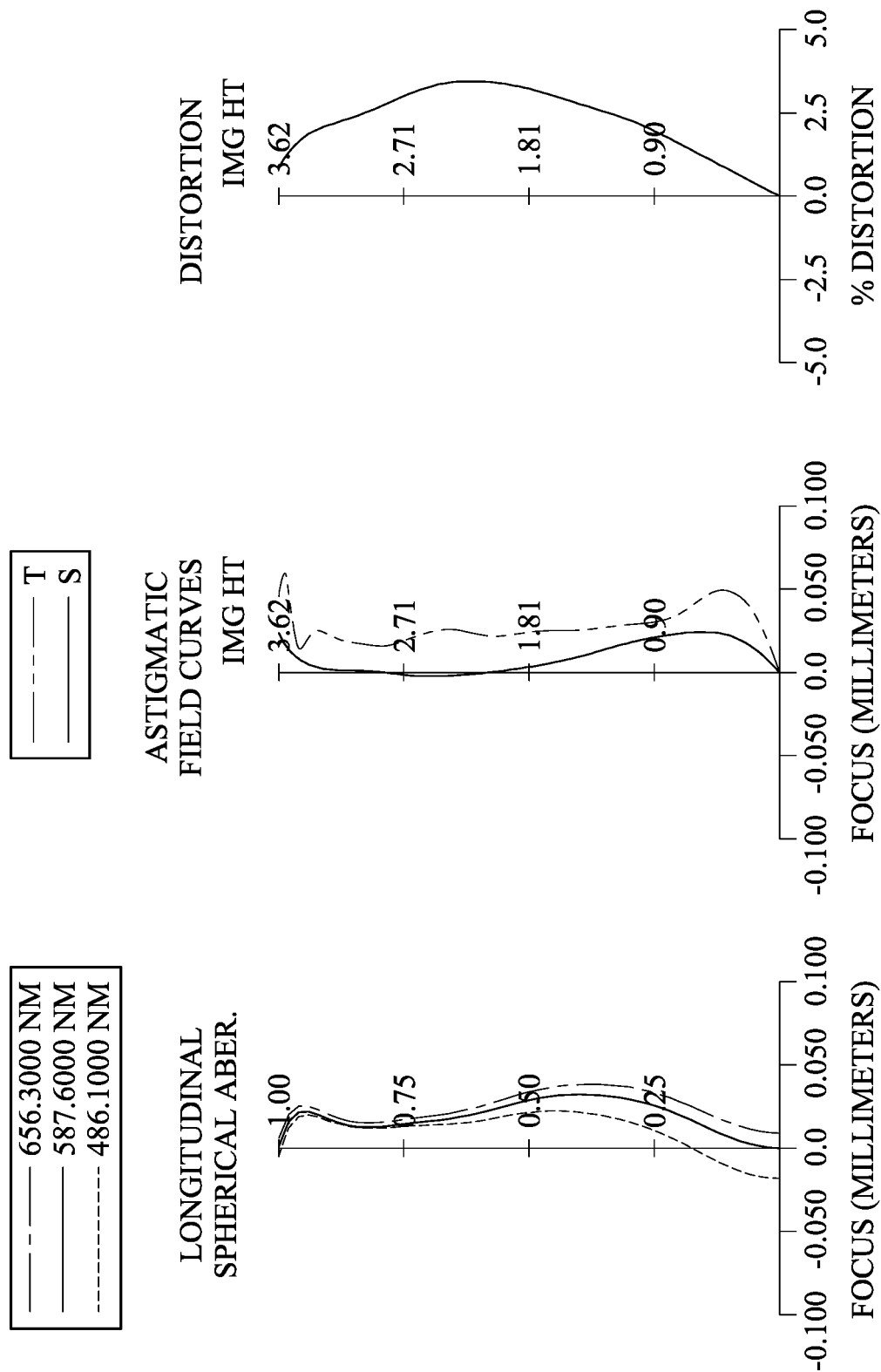
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit 1 includes the optical imaging lens system (its reference numeral is omitted) of the present disclosure and an image sensor IS. The optical imaging lens system includes, in order from an object side to an image side along an optical axis, a first lens element E1, an aperture stop ST, a second lens element E2, a stop S1, a third lens element E3, a fourth lens element E4, a fifth lens element E5, a sixth lens element E6, a filter E7 and an image surface IMG. The optical imaging lens system includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one critical point in an off-axis region thereof. The image-side surface of the third lens element E3 has one critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has two inflection points.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has four inflection points. The image-side surface of the fifth lens element E5 has three inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has three inflection points. The image-side surface of the sixth lens element E6 has three inflection points. The object-side surface of the sixth lens element E6 has two critical points in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the optical imaging lens system. The image sensor IS is disposed on or near the image surface IMG of the optical imaging lens system.

The equation of the aspheric surface profiles of the aforementioned lens elements of the 1st embodiment is expressed as follows:

$$X(Y) = (Y^2/R) / (1 + sqrt(1 - (1+k) \times (Y/R)^2)) + \sum_i (Ai) \times (Y^i),$$

where,
X is the displacement in parallel with the optical axis from an axial vertex on the aspheric surface to a point at a distance of Y from the optical axis on the aspheric surface;
Y is the vertical distance from the point on the aspheric surface to the optical axis;
R is the curvature radius;
k is the conic coefficient; and
Ai is the i-th aspheric coefficient, and in the embodiments, i may be, but is not limited to, 4, 6, 8, 10, 12, 14, 16, 18, 20, 22, 24, 26, 28, and 30.

In the optical imaging lens system of the image capturing unit according to the 1st embodiment, when a focal length of the optical imaging lens system is f, an f-number of the optical imaging lens system is Fno, and half of a maximum field of view of the optical imaging lens system is HFOV, these parameters have the following values: f=3.06 millimeters (mm), Fno=2.01, and HFOV=49.4 degrees (deg.).

When a curvature radius of the object-side surface of the first lens element E1 is R1, and a curvature radius of the image-side surface of the first lens element E1 is R2, the following condition is satisfied: (R1−R2)/(R1+R2)=−0.42.

When a curvature radius of the object-side surface of the second lens element E2 is R3, and a curvature radius of the image-side surface of the second lens element E2 is R4, the following condition is satisfied: (R3−R4)/(R3+R4)=0.52.

When a curvature radius of the object-side surface of the fourth lens element E4 is R7, and a curvature radius of the image-side surface of the fourth lens element E4 is R8, the following condition is satisfied: (R7−R8)/(R7+R8)=−0.05.

When a curvature radius of the object-side surface of the fifth lens element E5 is R9, and a curvature radius of the image-side surface of the fifth lens element E5 is R10, the following condition is satisfied: (R9+R10)/(R9−R10)=0.80.

When an Abbe number of the second lens element E2 is V2, an Abbe number of the third lens element E3 is V3, and an Abbe number of the sixth lens element E6 is V6, the following condition is satisfied: (V3+V6)/V2=1.00.

When a focal length of the first lens element E1 is f1, and a focal length of the fourth lens element E4 is f4, the following condition is satisfied: |f1/f4|=0.01.

When the focal length of the fourth lens element E4 is f4, and a focal length of the fifth lens element E5 is f5, the following condition is satisfied: |f5/f4|=0.0035.

When a maximum value among all chief ray angles CRA on the image surface IMG of the optical imaging lens system is CRAmax, the following condition is satisfied: CRAmax=38.58 degrees.

When a central thickness of the fourth lens element E4 is CT4, and a central thickness of the fifth lens element E5 is CT5, the following condition is satisfied: CT5/CT4=1.68.

When the focal length of the optical imaging lens system is f, and the focal length of the fourth lens element E4 is f4, the following condition is satisfied: f/f4=0.01.

When a displacement in parallel with the optical axis from an axial vertex of the image-side surface of the third lens element E3 to a maximum effective radius position of the image-side surface of the third lens element E3 is SAG32, an axial distance between the first lens element E1 and the second lens element E2 is T12, the following condition is satisfied: SAG32/T12=−0.39. In this embodiment, an axial distance between two adjacent lens elements is a distance in a paraxial region between two adjacent lens surfaces of the two adjacent lens elements.

When an axial distance between the aperture stop ST and the image-side surface of the sixth lens element E6 is SD, and an axial distance between the object-side surface of the first lens element E1 and the image-side surface of the sixth lens element E6 is TD, the following condition is satisfied: SD/TD=0.85.

When the axial distance between the first lens element E1 and the second lens element E2 is T12, and a maximum value among central thicknesses of all lens elements of the optical imaging lens system is CTmax, the following condition is satisfied: T12/CTmax=0.50.

When the axial distance between the first lens element E1 and the second lens element E2 is T12, and an axial distance between the fifth lens element E5 and the sixth lens element E6 is T56, the following condition is satisfied: T12/T56=1.31.

When an axial distance between the third lens element E3 and the fourth lens element E4 is T34, and a central thickness of the second lens element E2 is CT2, the following condition is satisfied: T34/CT2=1.03.

When an axial distance between the object-side surface of the first lens element E1 and the image surface IMG is TL, the following condition is satisfied: TL=4.21 mm.

When the axial distance between the object-side surface of the first lens element E1 and the image surface IMG is TL, and the focal length of the optical imaging lens system is f, the following condition is satisfied: TL/f=1.37.

When the axial distance between the object-side surface of the first lens element E1 and the image surface IMG is TL, and a maximum image height of the optical imaging lens system is ImgH, the following condition is satisfied: TL/ImgH=1.16.

When the Abbe number of the third lens element E3 is V3, and an Abbe number of the fourth lens element E4 is V4, the following condition is satisfied: V3+V4=40.7.

When the Abbe number of the sixth lens element E6 is V6, the following condition is satisfied: V6=36.8.

When a minimum value among Abbe numbers of all lens elements of the optical imaging lens system is Vmin, the following condition is satisfied: Vmin=19.5. In this embodiment, among the first lens element E1, the second lens element E2, the third lens element E3, the fourth lens element E4, the fifth lens element E5 and the sixth lens element E6, the Abbe number of the third lens element E3 is smaller than the Abbe numbers of the other lens elements, and Vmin is equal to the Abbe number of the third lens element E3.

When a vertical distance between the critical point on the image-side surface of the third lens element E3 and the optical axis is Yc32, and the focal length of the optical imaging lens system is f, the following condition is satisfied: Yc32/f=0.16.

When a maximum effective radius of the object-side surface of the first lens element E1 is Y11, and a maximum effective radius of the image-side surface of the sixth lens element E6 is Y62, the following condition is satisfied: Y11/Y62=0.35.

The detailed optical data of the 1st embodiment are shown in Table 1A and the aspheric surface data are shown in Table 1B below.

TABLE 1A

1st Embodiment
f = 3.06 mm, Fno = 2.01, HFOV = 49.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.5289 (ASP) | 0.381 | Plastic | 1.545 | 56.1 | 4.45 |
| 2 | | 3.7695 (ASP) | 0.099 | | | | |
| 3 | Ape. Stop | Plano | 0.181 | | | | |
| 4 | Lens 2 | −9.2945 (ASP) | 0.326 | Plastic | 1.544 | 56.0 | 7.62 |
| 5 | | −2.9014 (ASP) | −0.166 | | | | |
| 6 | Stop | Plano | 0.260 | | | | |
| 7 | Lens 3 | 15.3578 (ASP) | 0.234 | Plastic | 1.669 | 19.5 | −11.28 |
| 8 | | 5.0285 (ASP) | 0.336 | | | | |
| 9 | Lens 4 | −1.2398 (ASP) | 0.333 | Plastic | 1.650 | 21.2 | 603.65 |
| 10 | | −1.3667 (ASP) | 0.030 | | | | |
| 11 | Lens 5 | 11.2446 (ASP) | 0.560 | Plastic | 1.552 | 49.3 | 2.10 |
| 12 | | −1.2680 (ASP) | 0.213 | | | | |
| 13 | Lens 6 | 14.3632 (ASP) | 0.328 | Plastic | 1.574 | 36.8 | −1.77 |
| 14 | | 0.9419 (ASP) | 0.418 | | | | |
| 15 | Filter | Plano | 0.146 | Glass | 1.517 | 64.2 | — |
| 16 | | Plano | 0.527 | | | | |
| 17 | Image | Plano | — | | | | |

Note:
Reference wavelength is 587.6 nm (d-line).
An effective radius of the stop S1 (Surface 6) is 0.767 mm.

TABLE 1B

Aspheric Coefficients

| Surface # | 1 | 2 | 4 | 5 |
|---|---|---|---|---|
| k = | 1.053870000E+00 | 8.259790000E+00 | 0.000000000E+00 | 1.574200000E+00 |
| A4 = | −4.259516709E−02 | −4.153798955E−02 | −5.653399695E−02 | −3.111026241E−01 |
| A6 = | −1.081957812E−01 | −4.061579865E−02 | −7.388425686E−01 | −5.063288295E−01 |
| A8 = | 5.780258451E−01 | −5.260370761E−01 | 2.080839093E+01 | 2.137859430E+01 |
| A10 = | −2.898876403E+00 | 2.995108965E+00 | −3.841195328E+02 | −3.054651412E+02 |
| A12 = | 7.182825665E+00 | −1.009972851E+01 | 4.439711770E+03 | 2.870560860E+03 |
| A14 = | −1.023221929E+01 | 1.774492869E+01 | −3.402776109E+04 | −1.903572361E+04 |
| A16 = | 7.445874224E+00 | −1.528921479E+01 | 1.798019280E+05 | 9.065300293E+04 |
| A18 = | −2.150107453E+00 | 5.171779069E+00 | −6.701966416E+05 | −3.119092661E+05 |
| A20 = | — | — | 1.777831089E+06 | 7.736363634E+05 |
| A22 = | — | — | −3.338565166E+06 | −1.366163902E+06 |
| A24 = | — | — | 4.338528560E+06 | 1.670991904E+06 |
| A26 = | — | — | −3.711179427E+06 | −1.341949645E+06 |
| A28 = | — | — | 1.879391841E+06 | 6.346924907E+05 |
| A30 = | — | — | −4.266607146E+05 | −1.335393022E+05 |

| Surface # | 7 | 8 | 9 | 10 |
|---|---|---|---|---|
| k = | 0.000000000E+00 | −1.087200000E+01 | −1.230250000E+01 | −2.252200000E+01 |
| A4 = | −6.144950763E−01 | −2.378825093E−01 | −6.445246783E−01 | −6.252495990E−01 |
| A6 = | 1.941163158E+00 | 2.425826439E−01 | 3.947790860E+00 | 2.505371286E+00 |
| A8 = | −2.853064174E+01 | −2.036860428E+00 | −2.043708036E+01 | −1.075811551E+01 |
| A10 = | 3.294776058E+02 | 1.674037263E+01 | 8.040680561E+01 | 3.021081647E+01 |
| A12 = | −2.621965499E+03 | −8.401152849E+01 | −2.250436074E+02 | −5.159623876E+01 |
| A14 = | 1.458214769E+04 | 2.782116178E+02 | 4.541221183E+02 | 5.131008461E+01 |
| A16 = | −5.791334646E+04 | −6.448921761E+02 | −6.713142096E+02 | −2.085519990E+01 |
| A18 = | 1.660005343E+05 | 1.074874267E+03 | 7.320537776E+02 | −1.502248468E+01 |
| A20 = | −3.433301448E+05 | −1.299405650E+03 | −5.876278130E+02 | 2.864487980E+01 |
| A22 = | 5.061097259E+05 | 1.131946502E+03 | 3.428621219E+02 | −2.082097358E+01 |
| A24 = | −5.167609870E+05 | −6.933628878E+02 | −1.414539236E+02 | 8.826984558E+00 |
| A26 = | 3.457273242E+05 | 2.833856019E+02 | 3.912249834E+01 | −2.276434262E+00 |
| A28 = | −1.355024348E+05 | −6.927085774E+01 | −6.507421875E+00 | 3.326393562E−01 |
| A30 = | 2.338095799E+04 | 7.633919014E+00 | 4.918051521E−01 | −2.121416102E−02 |

| Surface # | 11 | 12 | 13 | 14 |
|---|---|---|---|---|
| k = | 1.557270000E+01 | −4.541080000E+00 | −1.000000000E+00 | −1.520470000E+00 |
| A4 = | 4.506220435E−01 | 4.008819177E−01 | 4.729806754E−01 | −5.537112316E−01 |
| A6 = | −1.714652680E+00 | −8.355772973E−01 | −1.197453019E+00 | 4.869634635E−01 |
| A8 = | 3.110624031E+00 | 6.079597135E−01 | 2.274732793E+00 | −2.609569391E−01 |
| A10 = | −3.417438509E+00 | 2.158694835E−01 | −2.347523972E+00 | 6.179501945E−02 |
| A12 = | 2.419527716E+00 | −6.873439090E−01 | 1.581849500E+00 | 2.430205576E−02 |
| A14 = | −1.069474896E+00 | 5.633358157E−01 | −7.377811429E−01 | −3.084965509E−02 |
| A16 = | 2.259141821E−01 | −2.664723536E−01 | 2.446263709E−01 | 1.555653059E−02 |
| A18 = | 3.828232297E−02 | 8.315894382E−02 | −5.837931596E−02 | −4.986183841E−03 |
| A20 = | −4.523330569E−02 | −1.787514945E−02 | 1.003830161E−02 | 1.104242407E−03 |
| A22 = | 1.602784889E−02 | 2.666440760E−03 | −1.229879013E−03 | −1.715869902E−04 |
| A24 = | −3.231978851E−03 | −2.710897367E−04 | 1.044533498E−04 | 1.839812211E−05 |
| A26 = | 3.926529652E−04 | 1.788622069E−05 | −5.824745434E−06 | −1.296268311E−06 |
| A28 = | −2.679817197E−05 | −6.882866514E−07 | 1.910271642E−07 | 5.394851961E−08 |
| A30 = | 7.895641164E−07 | 1.167722850E−08 | −2.777659169E−09 | −1.003421142E−09 |

In Table 1A, the curvature radius, the thickness and the focal length are shown in millimeters (mm). Surface numbers 0-17 represent the surfaces sequentially arranged from the object side to the image side along the optical axis. In Table 1B, k represents the conic coefficient of the equation of the aspheric surface profiles. A4-A30 represent the aspheric coefficients ranging from the 4th order to the 30th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 3:
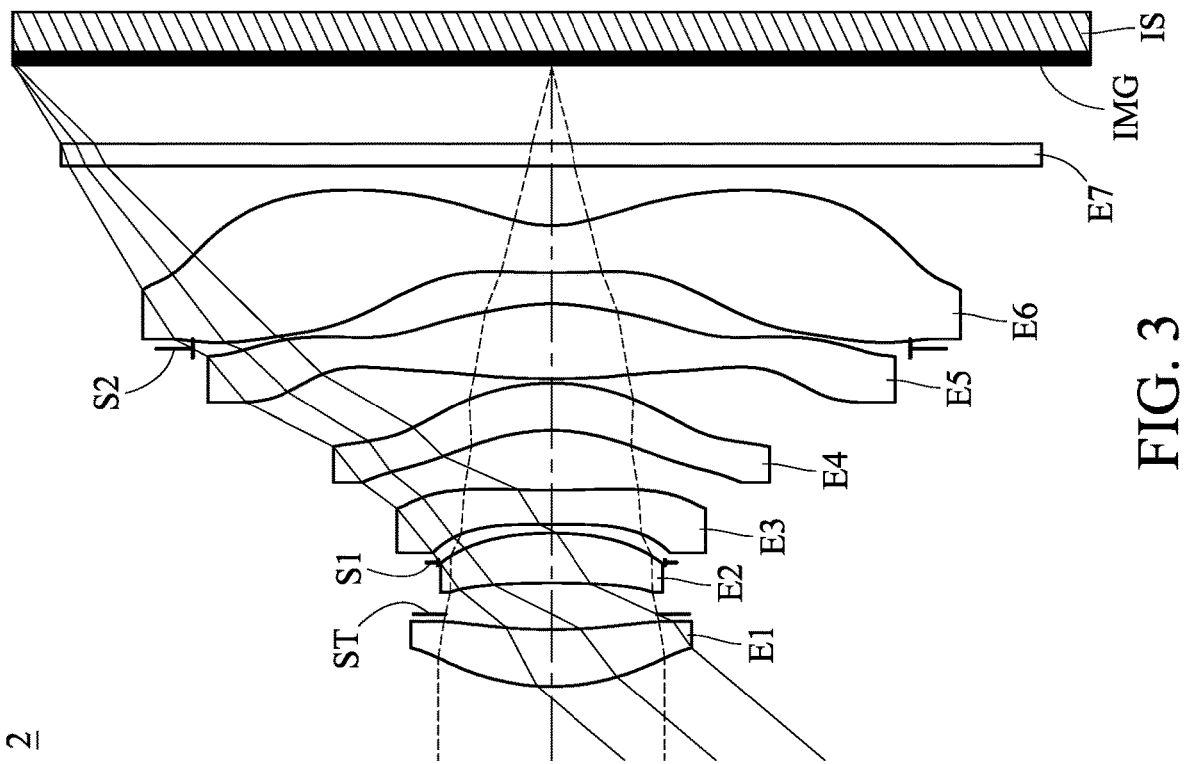
FIG. 3 is a schematic view of an image capturing unit according to the 2nd embodiment of the present disclosure.
Figure 4:
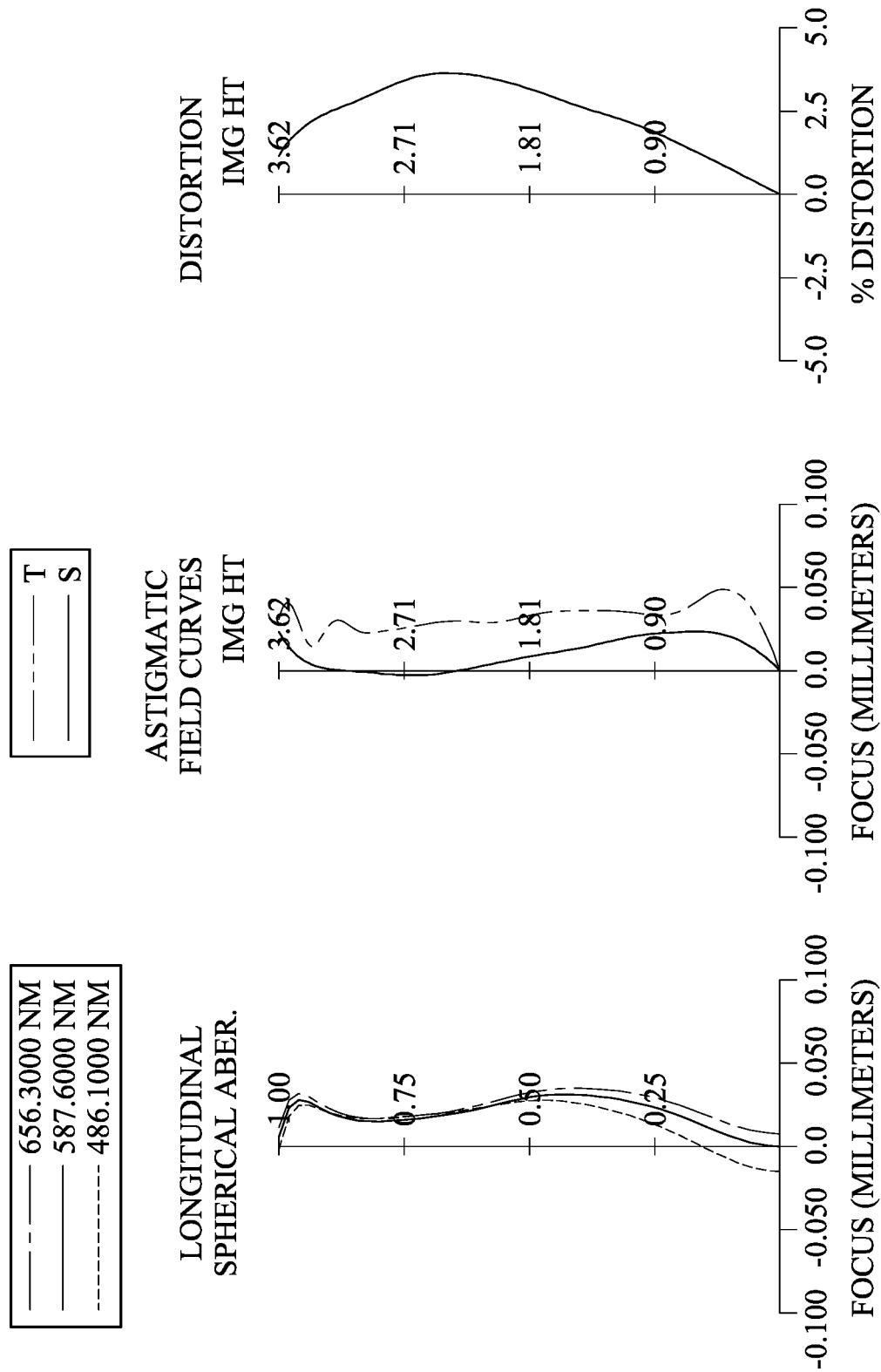
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit 2 includes the optical imaging lens system (its reference numeral is omitted) of the present disclosure and an image sensor IS. The optical imaging lens system includes, in order from an object side to an image side along an optical axis, a first lens element E1, an aperture stop ST, a second lens element E2, a stop S1, a third lens element E3, a fourth lens element E4, a fifth lens element E5, a stop S2, a sixth lens element E6, a filter E7 and an image surface IMG. The optical imaging lens system includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one critical point in an off-axis region thereof. The image-side surface of the third lens element E3 has one critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has three inflection points. The image-side surface of the fourth lens element E4 has three inflection points.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has five inflection points. The image-side surface of the fifth lens element E5 has four inflection points. The object-side surface of the fifth lens element E5 has one critical point in an off-axis region thereof. The image-side surface of the fifth lens element E5 has two critical points in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has three inflection points. The image-side surface of the sixth lens element E6 has three inflection points. The object-side surface of the sixth lens element E6 has two critical points in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the optical imaging lens system. The image sensor IS is disposed on or near the image surface IMG of the optical imaging lens system.

The detailed optical data of the 2nd embodiment are shown in Table 2A and the aspheric surface data are shown in Table 2B below.

TABLE 2A

2nd Embodiment
f = 3.03 mm, Fno = 1.99, HFOV = 49.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.5319 (ASP) | 0.383 | Plastic | 1.545 | 56.1 | 4.57 |
| 2 | | 3.6270 (ASP) | 0.104 | | | | |
| 3 | Ape. Stop | Plano | 0.208 | | | | |
| 4 | Lens 2 | −8.1335 (ASP) | 0.336 | Plastic | 1.544 | 56.0 | 6.60 |
| 5 | | −2.5278 (ASP) | −0.198 | | | | |
| 6 | Stop | Plano | 0.256 | | | | |
| 7 | Lens 3 | 31.1219 (ASP) | 0.231 | Plastic | 1.669 | 19.5 | −9.56 |
| 8 | | 5.2883 (ASP) | 0.402 | | | | |
| 9 | Lens 4 | −1.2705 (ASP) | 0.320 | Plastic | 1.669 | 19.5 | 57.23 |
| 10 | | −1.3539 (ASP) | 0.030 | | | | |
| 11 | Lens 5 | 9.0706 (ASP) | 0.505 | Plastic | 1.544 | 56.0 | 2.12 |
| 12 | | −1.2958 (ASP) | −0.303 | | | | |
| 13 | Stop | Plano | 0.510 | | | | |
| 14 | Lens 6 | 8.3462 (ASP) | 0.317 | Plastic | 1.566 | 37.4 | −1.75 |
| 15 | | 0.8738 (ASP) | 0.400 | | | | |
| 16 | Filter | Plano | 0.150 | Glass | 1.517 | 64.2 | — |
| 17 | | Plano | 0.531 | | | | |
| 18 | Image | Plano | — | | | | |

Note:
Reference wavelength is 587.6 nm (d-line).
An effective radius of the stop S1 (Surface 6) is 0.764 mm.
An effective radius of the stop S2 (Surface 13) is 2.412 mm.

TABLE 2B

Aspheric Coefficients

| Surface # | 1 | 2 | 4 | 5 |
|---|---|---|---|---|
| k = | 1.095690000E+00 | 8.308500000E+00 | 0.000000000E+00 | 3.420400000E+00 |
| A4 = | −4.680402122E−02 | −4.067544922E−02 | −8.738879551E−02 | −5.941223240E−01 |
| A6 = | −3.082910958E−02 | −8.111736868E−03 | 1.948940563E−01 | 3.027799815E+00 |
| A8 = | 1.019847454E−01 | −7.941855852E−01 | −1.968675055E+00 | −2.393363424E+01 |
| A10 = | −1.052311267E+00 | 4.500163396E+00 | −6.493716655E+01 | 2.190238491E+02 |
| A12 = | 2.950763767E+00 | −1.509504167E+01 | 1.540634977E+03 | −1.658615111E+03 |
| A14 = | −4.522724226E+00 | 2.709841284E+01 | −1.616327396E+04 | 9.033356004E+03 |
| A16 = | 3.303253140E+00 | −2.467020430E+01 | 1.029461233E+05 | −3.474315751E+04 |
| A18 = | −9.267204051E−01 | 9.058280152E+00 | −4.354821907E+05 | 9.454881347E+04 |
| A20 = | — | — | 1.265115981E+06 | −1.815041361E+05 |
| A22 = | — | — | −2.538022806E+06 | 2.419370527E+05 |
| A24 = | — | — | 3.454926715E+06 | −2.161159117E+05 |
| A26 = | — | — | −3.043016417E+06 | 1.206937726E+05 |
| A28 = | — | — | 1.561357922E+06 | −3.655636095E+04 |
| A30 = | — | — | −3.534979463E+05 | 4.163533854E+03 |

| Surface # | 7 | 8 | 9 | 10 |
|---|---|---|---|---|
| k = | 0.000000000E+00 | −3.701290000E+01 | −9.377200000E+00 | −1.401710000E+01 |
| A4 = | −9.153789086E−01 | −3.282172162E−01 | −5.561501005E−01 | −3.934185240E−01 |
| A6 = | 4.726220861E+00 | 7.883442413E−01 | 3.319818197E+00 | 4.543292836E−01 |
| A8 = | −5.430176216E+01 | −5.105192271E+00 | −1.810120623E+01 | −7.070590335E−01 |
| A10 = | 5.725896613E+02 | 3.673204860E+01 | 7.348752600E+01 | −2.746547154E+00 |
| A12 = | −4.394904931E+03 | −1.888826216E+02 | −2.080594622E+02 | 2.551212116E+01 |
| A14 = | 2.392295837E+04 | 6.612266821E+02 | 4.187436038E+02 | −8.034619508E+01 |
| A16 = | −9.358592227E+04 | −1.616432700E+03 | −6.109836975E+02 | 1.441854432E+02 |
| A18 = | 2.658183456E+05 | 2.811156751E+03 | 6.530311752E+02 | −1.668094066E+02 |
| A20 = | −5.487677085E+05 | −3.497232331E+03 | −5.114433724E+02 | 1.304279613E+02 |
| A22 = | 8.147785533E+05 | 3.086472286E+03 | 2.901279989E+02 | −6.987346716E+01 |
| A24 = | −8.473684859E+05 | −1.883756608E+03 | −1.159395086E+02 | 2.534612516E+01 |
| A26 = | 5.856625391E+05 | 7.544301126E+02 | 3.091204174E+01 | −5.962858376E+00 |
| A28 = | −2.415243396E+05 | −1.779258937E+02 | −4.927749558E+00 | 8.221798149E−01 |
| A30 = | 4.495124785E+04 | 1.867240572E+01 | 3.545854395E−01 | −5.049000474E−02 |

| Surface # | 11 | 12 | 14 | 15 |
|---|---|---|---|---|
| k = | 6.947570000E+00 | −5.198120000E+00 | −2.194970000E+01 | −1.554410000E+00 |
| A4 = | 4.923949581E−01 | 5.650671274E−01 | 9.158697689E−02 | −6.231903274E−01 |
| A6 = | −2.011639591E+00 | −1.440882362E+00 | −1.623809264E+00 | 5.954947039E−01 |
| A8 = | 3.919762305E+00 | 1.588053006E+00 | 3.294175514E+00 | −3.448300192E−01 |
| A10 = | −4.775951113E+00 | −6.745214168E−01 | −3.645930708E+00 | 9.894176160E−02 |
| A12 = | 4.011924628E+00 | −1.990593666E−01 | 2.636161011E+00 | 1.667681137E−02 |
| A14 = | −2.421750533E+00 | 4.079346662E−01 | −1.323304139E+00 | −3.198719560E−02 |
| A16 = | 1.064853406E+00 | −2.480012859E−01 | 4.747271006E−01 | 1.685550321E−02 |
| A18 = | −3.411812189E−01 | 8.968102546E−02 | −1.234262784E−01 | −5.411487713E−03 |
| A20 = | 7.886021117E−02 | −2.161648058E−02 | 2.331371917E−02 | 1.181088059E−03 |
| A22 = | −1.283966647E−02 | 3.573912167E−03 | −3.168045121E−03 | −1.792530925E−04 |
| A24 = | 1.406399214E−03 | −4.016638353E−04 | 3.017459386E−04 | 1.866244874E−05 |
| A26 = | −9.498466577E−05 | 2.936727019E−05 | −1.911420599E−05 | −1.271451207E−06 |
| A28 = | 3.286236677E−06 | −1.259867526E−06 | 7.228703962E−07 | 5.101234819E−08 |
| A30 = | −3.323015343E−08 | 2.404644887E−08 | −1.234051749E−08 | −9.126294649E−10 |

In the 2nd embodiment, the equation of the aspheric surface profiles of the aforementioned lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

Values of Conditional Expressions

| f [mm] | 3.03 | SAG32/T12 | −0.40 |
|---|---|---|---|
| Fno | 1.99 | SD/TD | 0.84 |
| HFOV [deg.] | 49.6 | T12/CTmax | 0.62 |
| (R1 − R2)/(R1 + R2) | −0.41 | T12/T56 | 1.51 |

TABLE 2C-continued

Values of Conditional Expressions

| (R3 − R4)/(R3 + R4) | 0.53 | T34/CT2 | 1.03 |
|---|---|---|---|
| (R7 − R8)/(R7 + R8) | −0.03 | TL [mm] | 4.18 |
| (R9 + R10)/(R9 − R10) | 0.75 | TL/f | 1.38 |
| (V3 + V6)/V2 | 1.02 | TL/ImgH | 1.16 |
| |f1/f4| | 0.08 | V3 + V4 | 38.9 |
| |f5/f4| | 0.04 | V6 | 37.4 |
| CRAmax [deg.] | 38.57 | Vmin | 19.5 |
| CT5/CT4 | 1.58 | Yc32/f | 0.14 |
| f/f4 | 0.05 | Y11/Y62 | 0.34 |

3rd Embodiment

Figure 5:
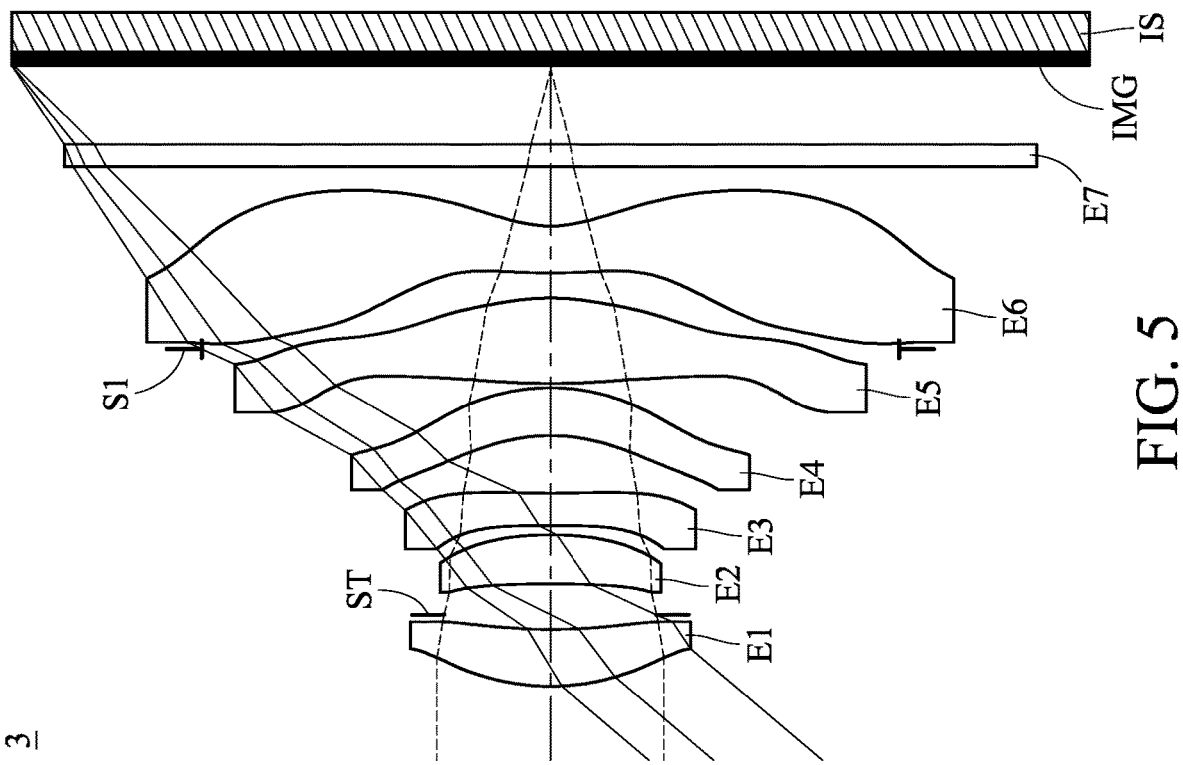
FIG. 5 is a schematic view of an image capturing unit according to the 3rd embodiment of the present disclosure.
Figure 6:
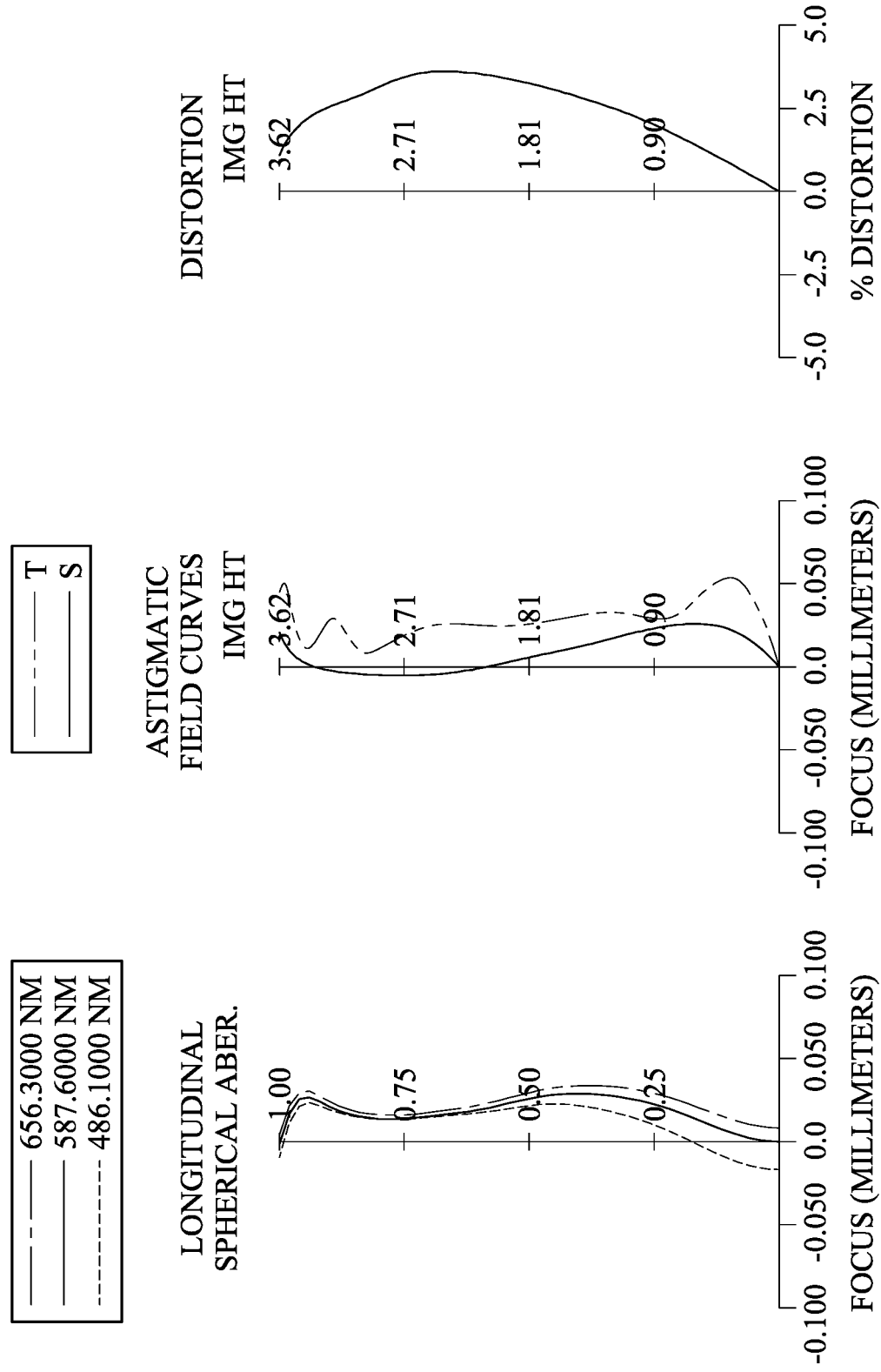
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit 3 includes the optical imaging lens system (its reference numeral is omitted) of the present disclosure and an image sensor IS. The optical imaging lens system includes, in order from an object side to an image side along an optical axis, a first lens element E1, an aperture stop ST, a second lens element E2, a third lens element E3, a fourth lens element E4, a fifth lens element E5, a stop S1, a sixth lens element E6, a filter E7 and an image surface IMG. The optical imaging lens system includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being convex in a paraxial region thereof and an image-side surface being concave in a paraxial region thereof. The third lens element E3 is made of plastic material and has the object-side surface and the image-side surface being both aspheric. The object-side surface of the third lens element E3 has one inflection point. The image-side surface of the third lens element E3 has two inflection points. The object-side surface of the third lens element E3 has one critical point in an off-axis region thereof. The image-side surface of the third lens element E3 has one critical point in an off-axis region thereof.

The fourth lens element E4 with positive refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has two inflection points. The image-side surface of the fifth lens element E5 has three inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has five inflection points. The image-side surface of the sixth lens element E6 has three inflection points. The object-side surface of the sixth lens element E6 has two critical points in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the optical imaging lens system. The image sensor IS is disposed on or near the image surface IMG of the optical imaging lens system.

The detailed optical data of the 3rd embodiment are shown in Table 3A and the aspheric surface data are shown in Table 3B below.

TABLE 3A

3rd Embodiment
f = 3.03 mm, Fno = 1.99, HFOV = 49.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.5234 (ASP) | 0.383 | Plastic | 1.545 | 56.1 | 4.49 |
| 2 | | 3.6843 (ASP) | 0.100 | | | | |
| 3 | Ape. Stop | Plano | 0.206 | | | | |
| 4 | Lens 2 | −9.2027 (ASP) | 0.330 | Plastic | 1.544 | 56.0 | 6.52 |
| 5 | | −2.5934 (ASP) | 0.061 | | | | |
| 6 | Lens 3 | 76.5902 (ASP) | 0.220 | Plastic | 1.669 | 19.5 | −10.60 |
| 7 | | 6.4843 (ASP) | 0.387 | | | | |
| 8 | Lens 4 | −1.2174 (ASP) | 0.323 | Plastic | 1.669 | 19.5 | 32.23 |
| 9 | | −1.2749 (ASP) | 0.030 | | | | |
| 10 | Lens 5 | 10.8601 (ASP) | 0.575 | Plastic | 1.544 | 56.0 | 2.31 |
| 11 | | −1.3977 (ASP) | −0.344 | | | | |
| 12 | Stop | Plano | 0.511 | | | | |
| 13 | Lens 6 | 4.4463 (ASP) | 0.315 | Plastic | 1.566 | 37.4 | −1.83 |
| 14 | | 0.8198 (ASP) | 0.400 | | | | |
| 15 | Filter | Plano | 0.150 | Glass | 1.517 | 64.2 | — |
| 16 | | Plano | 0.535 | | | | |
| 17 | Image | Plano | — | | | | |

Note:
Reference wavelength is 587.6 nm (d-line).
An effective radius of the stop S1 (Surface 12) is 2.345 mm.

TABLE 3B

Aspheric Coefficients

| Surface # | 1 | 2 | 4 | 5 |
|---|---|---|---|---|
| k = | 0.000000000E+00 | 7.676550000E+00 | 0.000000000E+00 | 2.831650000E+00 |
| A4 = | −5.410460994E−03 | −3.372774116E−02 | −7.109240173E−02 | −5.361164068E−01 |
| A6 = | −6.574693115E−02 | −2.276833642E−01 | −4.991141706E−01 | 2.350843549E+00 |
| A8 = | 6.366088298E−01 | 2.083649292E+00 | 1.506293652E+01 | −1.093404101E+01 |
| A10 = | −4.360848681E+00 | −1.630151012E+01 | −3.549458535E+02 | 5.279110935E+00 |
| A12 = | 1.702377830E+01 | 7.742699209E+01 | 5.064537202E+03 | 6.599817832E+02 |
| A14 = | −4.368665290E+01 | −2.409554370E+02 | −4.664731071E+04 | −7.781302612E+03 |
| A16 = | 7.486322105E+01 | 4.937342388E+02 | 2.908315677E+05 | 4.971853427E+04 |
| A18 = | −8.561611755E+01 | −6.575641436E+02 | −1.262226392E+06 | −2.059948392E+05 |
| A20 = | 6.236256445E+01 | 5.478368199E+02 | 3.857568765E+06 | 5.818411835E+05 |
| A22 = | −2.590787815E+01 | −2.596391556E+02 | −8.270085133E+06 | −1.131874843E+06 |
| A24 = | 4.643072696E+00 | 5.357051562E+01 | 1.216826006E+07 | 1.492467331E+06 |
| A26 = | — | — | −1.169457409E+07 | −1.272704337E+06 |
| A28 = | — | — | 6.605619241E+06 | 6.320463621E+05 |
| A30 = | — | — | −1.661125469E+06 | −1.384313765E+05 |

| Surface # | 6 | 7 | 8 | 9 |
|---|---|---|---|---|
| k = | 0.000000000E+00 | −5.106060000E+01 | −8.298580000E+00 | −1.327170000E+01 |
| A4 = | −8.335170111E−01 | −3.105941464E−01 | −5.876009520E−01 | −3.563762053E−01 |
| A6 = | 4.063590122E+00 | 4.525076780E−01 | 3.997729631E+00 | 2.466351717E−01 |
| A8 = | −4.716010044E+01 | −1.583837881E+00 | −2.631091902E+01 | −1.151034500E+00 |
| A10 = | 5.167363596E+02 | 1.481424929E+01 | 1.224189430E+02 | 2.286392988E+00 |
| A12 = | −4.110022624E+03 | −1.015039245E+02 | −3.872522321E+02 | 1.133312062E+01 |
| A14 = | 2.300693632E+04 | 4.324438174E+02 | 8.616800137E+02 | −6.221873402E+01 |
| A16 = | −9.171176095E+04 | −1.230975210E+03 | −1.383969964E+03 | 1.398600509E+02 |
| A18 = | 2.626024107E+05 | 2.437069188E+03 | 1.626120685E+03 | −1.881823459E+02 |
| A20 = | −5.400262415E+05 | −3.407396058E+03 | −1.401368908E+03 | 1.669250567E+02 |
| A22 = | 7.886603968E+05 | 3.354181912E+03 | 8.777183550E+02 | −1.005818089E+02 |
| A24 = | −7.963836337E+05 | −2.273453908E+03 | −3.895843095E+02 | 4.094598785E+01 |
| A26 = | 5.275481553E+05 | 1.008867068E+03 | 1.163213580E+02 | −1.081417594E+01 |
| A28 = | −2.058793061E+05 | −2.633893566E+02 | −2.096396509E+01 | 1.675991075E+00 |
| A30 = | 3.582255630E+04 | 3.059567087E+01 | 1.722017640E+00 | −1.158381935E−01 |

| Surface # | 10 | 11 | 13 | 14 |
|---|---|---|---|---|
| k = | 4.229850000E−01 | −4.024560000E+00 | −6.522090000E+01 | −1.635520000E+00 |
| A4 = | 5.955359277E−01 | 6.153613451E−01 | 4.241133213E−02 | −7.177162775E−01 |
| A6 = | −2.862924195E+00 | −1.747861748E+00 | −1.631006375E+00 | 8.423693650E−01 |
| A8 = | 6.723210685E+00 | 2.281509710E+00 | 3.540105737E+00 | −6.875727925E−01 |
| A10 = | −1.006979506E+01 | −1.461002351E+00 | −4.126522548E+00 | 4.117096984E−01 |
| A12 = | 1.058628872E+01 | 2.684289473E−01 | 3.127795483E+00 | −1.846857608E−01 |
| A14 = | −8.170815141E+00 | 2.970680339E−01 | −1.640456591E+00 | 6.246328062E−02 |
| A16 = | 4.715074820E+00 | −2.832509974E−01 | 6.130016849E−01 | −1.588671661E−02 |
| A18 = | −2.041041386E+00 | 1.276226709E−01 | −1.655590156E−01 | 3.005611361E−03 |
| A20 = | 6.573972250E−01 | −3.626712032E−02 | 3.240965721E−02 | −4.142270867E−04 |
| A22 = | −1.544463068E−01 | 6.906597227E−03 | −4.555552795E−03 | 4.010616537E−05 |
| A24 = | 2.555588786E−02 | −8.826838863E−04 | 4.481355997E−04 | −2.557186028E−06 |
| A26 = | −2.804845632E−03 | 7.278317308E−05 | −2.928267687E−05 | 9.405727569E−08 |
| A28 = | 1.821989055E−04 | −3.500531285E−06 | 1.141247114E−06 | −1.336663108E−09 |
| A30 = | −5.270407434E−06 | 7.455653968E−08 | −2.006231919E−08 | −1.002738882E−11 |

In the 3rd embodiment, the equation of the aspheric surface profiles of the aforementioned lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

Values of Conditional Expressions

| f [mm] | 3.03 | SAG32/T12 | −0.38 |
|---|---|---|---|
| Fno | 1.99 | SD/TD | 0.84 |
| HFOV [deg.] | 49.6 | T12/CTmax | 0.53 |

TABLE 3C-continued

Values of Conditional Expressions

| (R1 − R2)/(R1 + R2) | −0.41 | T12/T56 | 1.83 |
|---|---|---|---|
| (R3 − R4)/(R3 + R4) | 0.56 | T34/CT2 | 1.17 |
| (R7 − R8)/(R7 + R8) | −0.02 | TL [mm] | 4.18 |
| (R9 + R10)/(R9 − R10) | 0.77 | TL/f | 1.38 |
| (V3 + V6)/V2 | 1.02 | TL/ImgH | 1.16 |
| |f1/f4| | 0.14 | V3 + V4 | 38.9 |
| |f5/f4| | 0.07 | V6 | 37.4 |
| CRAmax [deg.] | 38.60 | Vmin | 19.5 |
| CT5/CT4 | 1.78 | Yc32/f | 0.13 |
| f/f4 | 0.09 | Y11/Y62 | 0.35 |

4th Embodiment

Figure 7:
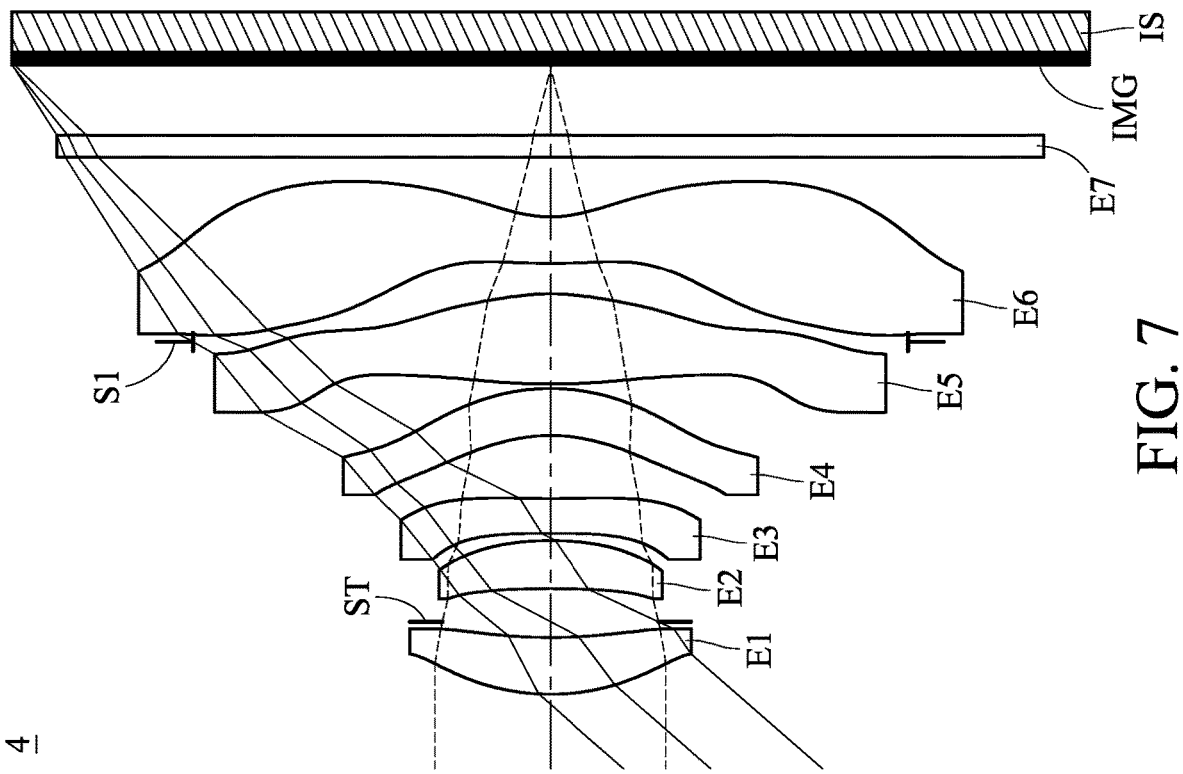
FIG. 7 is a schematic view of an image capturing unit according to the 4th embodiment of the present disclosure.
Figure 8:
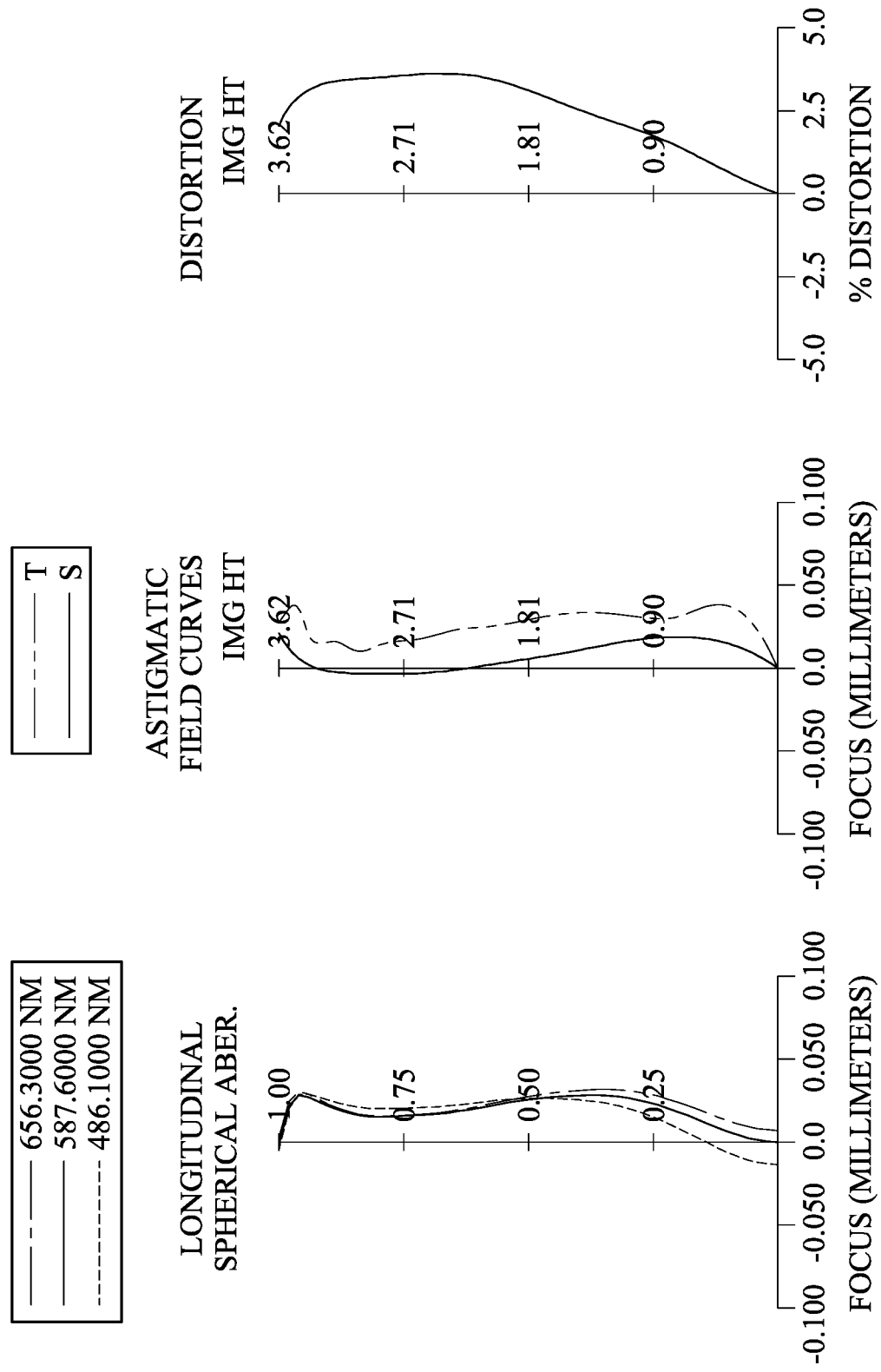
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit 4 includes the optical imaging lens system (its reference numeral is omitted) of the present disclosure and an image sensor IS. The optical imaging lens system includes, in order from an object side to an image side along an optical axis, a first lens element E1, an aperture stop ST, a second lens element E2, a third lens element E3, a fourth lens element E4, a fifth lens element E5, a stop S1, a sixth lens element E6, a filter E7 and an image surface IMG. The optical imaging lens system includes six lens elements (E1, E2, E3, E4, E5 and E6) with no additional lens element disposed between each of the adjacent six lens elements.

The first lens element E1 with positive refractive power has an object-side surface being convex in a paraxial region thereof and an image-side surface being concave in a paraxial region thereof. The first lens element E1 is made of plastic material and has the object-side surface and the image-side surface being both aspheric. The object-side surface of the first lens element E1 has one inflection point. The image-side surface of the first lens element E1 has one inflection point. The image-side surface of the first lens element E1 has one critical point in an off-axis region thereof.

The second lens element E2 with positive refractive power has an object-side surface being concave in a paraxial region thereof and an image-side surface being convex in a paraxial region thereof. The second lens element E2 is made of plastic material and has the object-side surface and the image-side surface being both aspheric.

The third lens element E3 with negative refractive power has an object-side surface being concave in a paraxial region thereof and an image-side surface being concave in a paraxial region thereof. The third lens element E3 is made of plastic material and has the object-side surface and the image-side surface being both aspheric. The image-side surface of the third lens element E3 has two inflection points. The image-side surface of the third lens element E3 has one critical point in an off-axis region thereof.

The fourth lens element E4 with negative refractive power has an object-side surface being concave in a paraxial region thereof and an image-side surface being convex in a paraxial region thereof. The fourth lens element E4 is made of plastic material and has the object-side surface and the image-side surface being both aspheric. The object-side surface of the fourth lens element E4 has two inflection points. The image-side surface of the fourth lens element E4 has two inflection points.

The fifth lens element E5 with positive refractive power has an object-side surface being convex in a paraxial region thereof and an image-side surface being convex in a paraxial region thereof. The fifth lens element E5 is made of plastic material and has the object-side surface and the image-side surface being both aspheric. The object-side surface of the fifth lens element E5 has three inflection points. The image-side surface of the fifth lens element E5 has four inflection points. The object-side surface of the fifth lens element E5 has one critical point in an off-axis region thereof.

The sixth lens element E6 with negative refractive power has an object-side surface being convex in a paraxial region thereof and an image-side surface being concave in a paraxial region thereof. The sixth lens element E6 is made of plastic material and has the object-side surface and the image-side surface being both aspheric. The object-side surface of the sixth lens element E6 has three inflection points. The image-side surface of the sixth lens element E6 has three inflection points. The object-side surface of the sixth lens element E6 has two critical points in an off-axis region thereof. The image-side surface of the sixth lens element E6 has one critical point in an off-axis region thereof.

The filter E7 is made of glass material and located between the sixth lens element E6 and the image surface IMG, and will not affect the focal length of the optical imaging lens system. The image sensor IS is disposed on or near the image surface IMG of the optical imaging lens system.

The detailed optical data of the 4th embodiment are shown in Table 4A and the aspheric surface data are shown in Table 4B below.

TABLE 4A

4th Embodiment
f = 3.09 mm, Fno = 1.99, HFOV = 48.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.5068 (ASP) | 0.382 | Plastic | 1.545 | 56.1 | 4.45 |
| 2 | | 3.6271 (ASP) | 0.106 | | | | |
| 3 | Ape. Stop | Plano | 0.222 | | | | |
| 4 | Lens 2 | −6.8402 (ASP) | 0.326 | Plastic | 1.544 | 56.0 | 6.55 |
| 5 | | −2.3822 (ASP) | 0.049 | | | | |
| 6 | Lens 3 | −542.0054 (ASP) | 0.235 | Plastic | 1.686 | 18.4 | −11.69 |
| 7 | | 8.1438 (ASP) | 0.423 | | | | |
| 8 | Lens 4 | −1.2099 (ASP) | 0.317 | Plastic | 1.680 | 18.2 | −120.32 |
| 9 | | −1.3583 (ASP) | 0.030 | | | | |
| 10 | Lens 5 | 7.5966 (ASP) | 0.607 | Plastic | 1.544 | 56.0 | 2.30 |
| 11 | | −1.4563 (ASP) | −0.324 | | | | |
| 12 | Stop | Plano | 0.531 | | | | |
| 13 | Lens 6 | 5.2014 (ASP) | 0.313 | Plastic | 1.566 | 37.4 | −1.84 |
| 14 | | 0.8497 (ASP) | 0.400 | | | | |
| 15 | Filter | Plano | 0.150 | Glass | 1.517 | 64.2 | — |

TABLE 4A-continued

4th Embodiment
f = 3.09 mm, Fno = 1.99, HFOV = 48.8 deg.

| Surface # | | Curvature Radius | Thickness | Material | Index | Abbe # | Focal Length |
|---|---|---|---|---|---|---|---|
| 16 | | Plano | 0.472 | | | | |
| 17 | Image | Plano | — | | | | |

Note:
Reference wavelength is 587.6 nm (d-line).
An effective radius of the stop S1 (Surface 12) is 2.405 mm.

TABLE 4B

Aspheric Coefficients

| Surface # | 1 | 2 | 4 | 5 |
|---|---|---|---|---|
| k = | 0.000000000E+00 | 8.675130000E+00 | 0.000000000E+00 | 1.901190000E+00 |
| A4 = | −4.854315625E−03 | −2.831344422E−02 | −1.045415014E−01 | −6.306601308E−01 |
| A6 = | −5.719163980E−03 | −1.500087319E−01 | 9.980898866E−01 | 3.996522165E+00 |
| A8 = | 3.269557232E−01 | 6.750352058E−01 | −2.914482840E+01 | −3.882164092E+01 |
| A10 = | −3.612559579E+00 | −2.694929843E+00 | 4.966952402E+02 | 4.054289186E+02 |
| A12 = | 1.855910610E+01 | −5.880959475E−01 | −5.860079599E+03 | −3.382335741E+03 |
| A14 = | −5.954921538E+01 | 4.476356201E+01 | 4.926858016E+04 | 2.046683874E+04 |
| A16 = | 1.240792013E+02 | −1.907953191E+02 | −2.990345603E+05 | −8.921821658E+04 |
| A18 = | −1.682238770E+02 | 4.067661704E+02 | 1.315180627E+06 | 2.816990998E+05 |
| A20 = | 1.422619264E+02 | −4.840228205E+02 | −4.176067390E+06 | −6.442072076E+05 |
| A22 = | −6.785119719E+01 | 3.057109074E+02 | 9.449848200E+06 | 1.055545619E+06 |
| A24 = | 1.391985949E+01 | −7.981238261E+01 | −1.482954836E+07 | −1.206636222E+06 |
| A26 = | — | — | 1.531403924E+07 | 9.126169072E+05 |
| A28 = | — | — | −9.349442933E+06 | −4.096961466E+05 |
| A30 = | — | — | 2.554753241E+06 | 8.246834308E+04 |

| Surface # | 6 | 7 | 8 | 9 |
|---|---|---|---|---|
| k = | 0.000000000E+00 | −5.206440000E+01 | −7.719860000E+00 | −1.418000000E+01 |
| A4 = | −8.416201473E−01 | −2.921784688E−01 | −5.582174420E−01 | −4.325268939E−01 |
| A6 = | 3.816030682E+00 | 7.509212800E−02 | 3.379709168E+00 | 1.015619975E+00 |
| A8 = | −3.067706491E+01 | 4.523979889E+00 | −1.985601000E+01 | −4.628731147E+00 |
| A10 = | 2.505207233E+02 | −4.463053474E+01 | 8.532053665E+01 | 1.436533395E+01 |
| A12 = | −1.600144600E+03 | 2.658069928E+02 | −2.535843923E+02 | −2.382462443E+01 |
| A14 = | 7.299320098E+03 | −1.106223837E+03 | 5.350097226E+02 | 1.692874458E+01 |
| A16 = | −2.355361877E+04 | 3.301403337E+03 | −8.199121904E+02 | 1.006300730E+01 |
| A18 = | 5.381060865E+04 | −7.122416975E+03 | 9.237344005E+02 | −3.604008982E+01 |
| A20 = | −8.673625389E+04 | 1.109996768E+04 | −7.659813369E+02 | 4.010323283E+01 |
| A22 = | 9.772154347E+04 | −1.236002590E+04 | 4.623988407E+02 | −2.606138022E+01 |
| A24 = | −7.616110740E+04 | 9.580985789E+03 | −1.977154164E+02 | 1.077741218E+01 |
| A26 = | 4.104647651E+04 | −4.908445603E+03 | 5.671699031E+01 | −2.804078234E+00 |
| A28 = | −1.526659689E+04 | 1.493275943E+03 | −9.777130442E+00 | 4.202812085E−01 |
| A30 = | 3.257022407E+03 | −2.041967949E+02 | 7.639541874E−01 | −2.774240676E−02 |

| Surface # | 10 | 11 | 13 | 14 |
|---|---|---|---|---|
| k = | −1.431230000E+01 | −4.562760000E+00 | −6.030910000E+01 | −1.578600000E+00 |
| A4 = | 4.592223025E−01 | 5.330410005E−01 | −1.068419046E−01 | −6.679537171E−01 |
| A6 = | −2.047193253E+00 | −1.419635012E+00 | −1.306175245E+00 | 7.004013883E−01 |
| A8 = | 4.426597233E+00 | 1.908637348E+00 | 2.747394327E+00 | −4.936871482E−01 |
| A10 = | −6.189319825E+00 | −1.639545136E+00 | −3.048969624E+00 | 2.467660087E−01 |
| A12 = | 6.173318283E+00 | 1.136340245E+00 | 2.203538431E+00 | −8.813686354E−02 |
| A14 = | −4.596158492E+00 | −7.229674646E−01 | −1.106676266E+00 | 2.180259932E−02 |
| A16 = | 2.602281310E+00 | 3.993365430E−01 | 3.974133747E−01 | −3.322373167E−03 |
| A18 = | −1.124562761E+00 | −1.717521568E−01 | −1.033918541E−01 | 1.408137144E−04 |
| A20 = | 3.672777517E−01 | 5.399497586E−02 | 1.952463089E−02 | 6.530639947E−05 |
| A22 = | −8.849652521E−02 | −1.201598504E−02 | −2.649698078E−03 | −1.785713499E−05 |
| A24 = | 1.511364506E−02 | 1.835965139E−03 | 2.518002013E−04 | 2.343795922E−06 |
| A26 = | −1.715464333E−03 | −1.829953008E−04 | −1.590197433E−05 | −1.796535616E−07 |
| A28 = | 1.151287462E−04 | 1.071207428E−05 | 5.992824210E−07 | 7.690887815E−09 |
| A30 = | −3.431224038E−06 | −2.793262134E−07 | −1.019336977E−08 | −1.425444690E−10 |

In the 4th embodiment, the equation of the aspheric surface profiles of the aforementioned lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

| Values of Conditional Expressions | | | |
|---|---|---|---|
| f [mm] | 3.09 | SAG32/T12 | −0.44 |
| Fno | 1.99 | SD/TD | 0.85 |
| HFOV [deg.] | 48.8 | T12/CTmax | 0.54 |
| (R1 − R2)/(R1 + R2) | −0.41 | T12/T56 | 1.58 |
| (R3 − R4)/(R3 + R4) | 0.48 | T34/CT2 | 1.30 |
| (R7 − R8)/(R7 + R8) | −0.06 | TL [mm] | 4.24 |
| (R9 + R10)/(R9 − R10) | 0.68 | TL/f | 1.37 |
| (V3 + V6)/V2 | 1.00 | TL/ImgH | 1.17 |
| |f1/f4| | 0.04 | V3 + V4 | 36.5 |
| |f5/f4| | 0.02 | V6 | 37.4 |
| CRAmax [deg.] | 38.74 | Vmin | 18.2 |
| CT5/CT4 | 1.91 | Yc32/f | 0.11 |
| f/f4 | −0.03 | Y11/Y62 | 0.34 |

5th Embodiment

Figure 9:
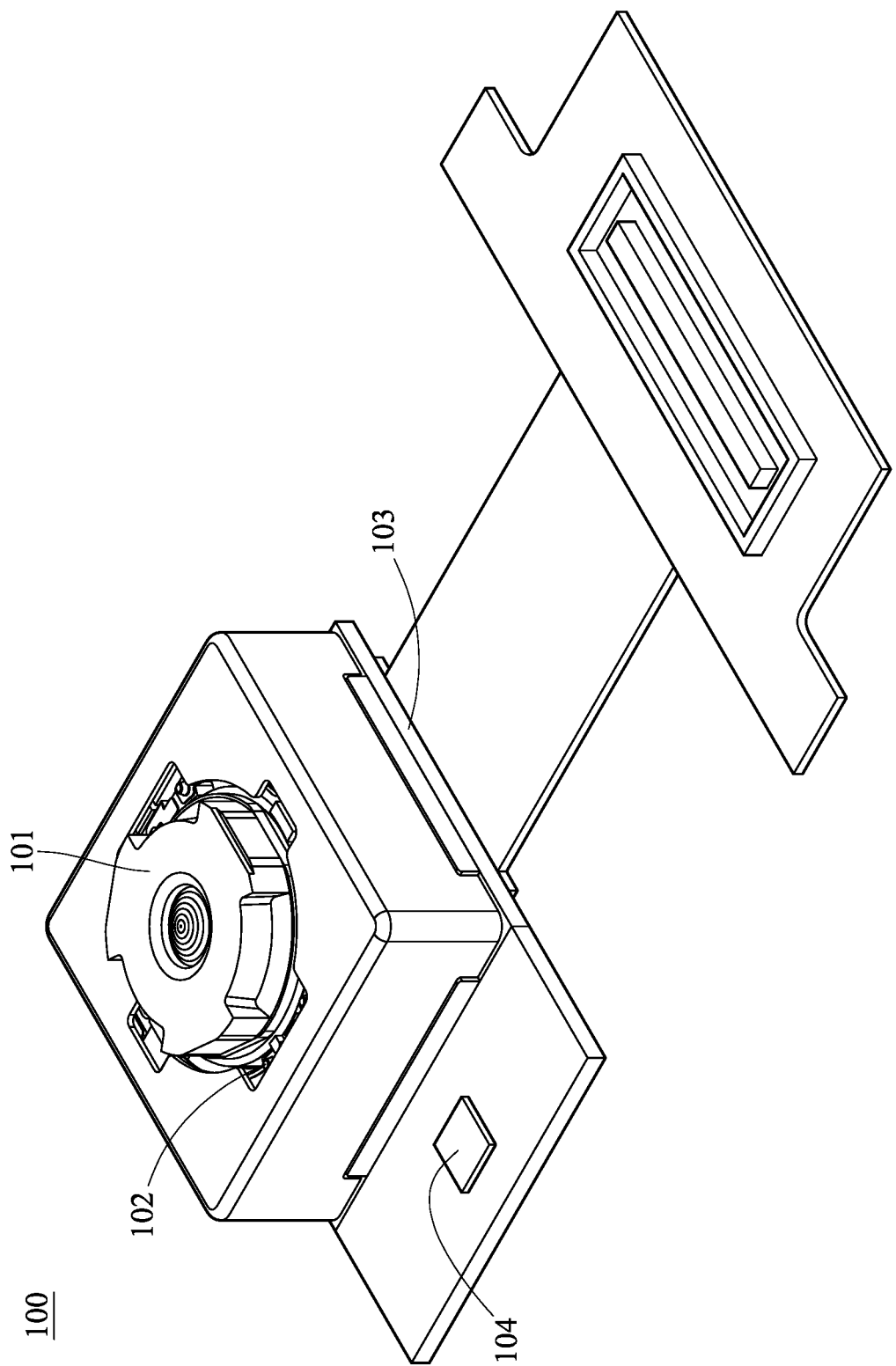
FIG. 9 is a perspective view of an image capturing unit according to the 5th embodiment of the present disclosure.

FIG. 9 is a perspective view of an image capturing unit according to the 5th embodiment of the present disclosure. In this embodiment, an image capturing unit 100 is a camera module including a lens unit 101, a driving device 102, an image sensor 103 and an image stabilizer 104. The lens unit 101 includes the optical imaging lens system as disclosed in the 1st embodiment, a barrel and a holder member (their reference numerals are omitted) for holding the optical imaging lens system. However, the lens unit 101 may alternatively be provided with the optical imaging lens system disclosed in other embodiments of the present disclosure, and the present disclosure is not limited thereto. The imaging light converges in the lens unit 101 of the image capturing unit 100 to generate an image with the driving device 102 utilized for image focusing on the image sensor 103, and the generated image is then digitally transmitted to other electronic component for further processing.

The driving device 102 can have auto focusing functionality, and different driving configurations can be obtained through the usages of voice coil motors (VCM), micro electro-mechanical systems (MEMS), piezoelectric systems, or shape memory alloy materials. The driving device 102 is favorable for obtaining a better imaging position of the lens unit 101, so that a clear image of the imaged object can be captured by the lens unit 101 with different object distances. The image sensor 103 (for example, CCD or CMOS), which can feature high photosensitivity and low noise, is disposed on the image surface of the optical imaging lens system to provide higher image quality.

The image stabilizer 104, such as an accelerometer, a gyro sensor and a Hall Effect sensor, is configured to work with the driving device 102 to provide optical image stabilization (OIS). The driving device 102 working with the image stabilizer 104 is favorable for compensating for pan and tilt of the lens unit 101 to reduce blurring associated with motion during exposure. In some cases, the compensation can be provided by electronic image stabilization (EIS) with image processing software, thereby improving image quality while in motion or low-light conditions.

In this embodiment, the image sensor 103 is substantially in a square shape. Therefore, it is favorable for more flexibly using image information in different direction angles so as to meet different requirements of operators.

6th Embodiment

Figure 10:
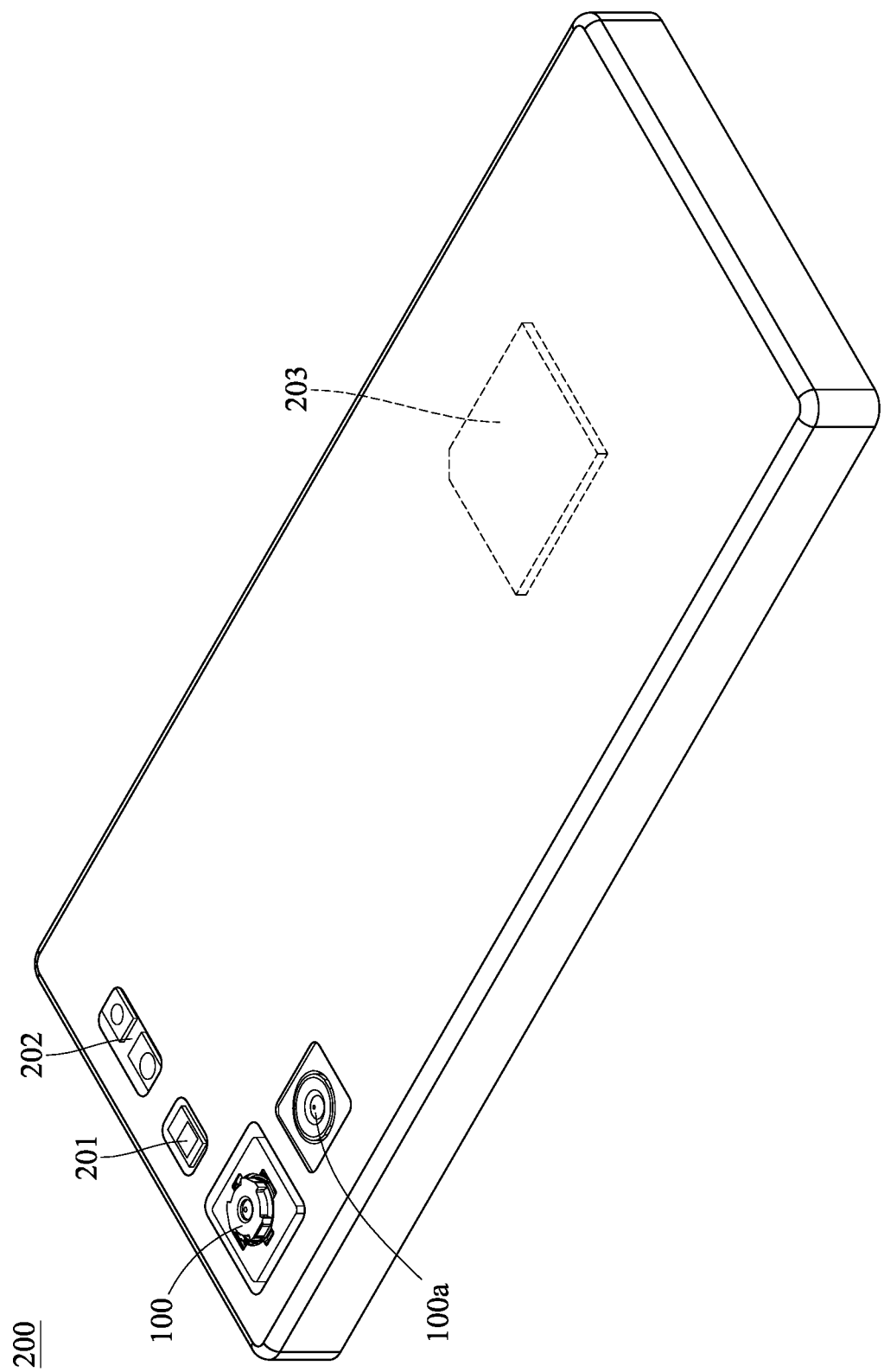
FIG. 10 is one perspective view of an electronic device according to the 6th embodiment of the present disclosure.

FIG. 10 is one perspective view of an electronic device according to the 6th embodiment of the present disclosure.

Figure 11:
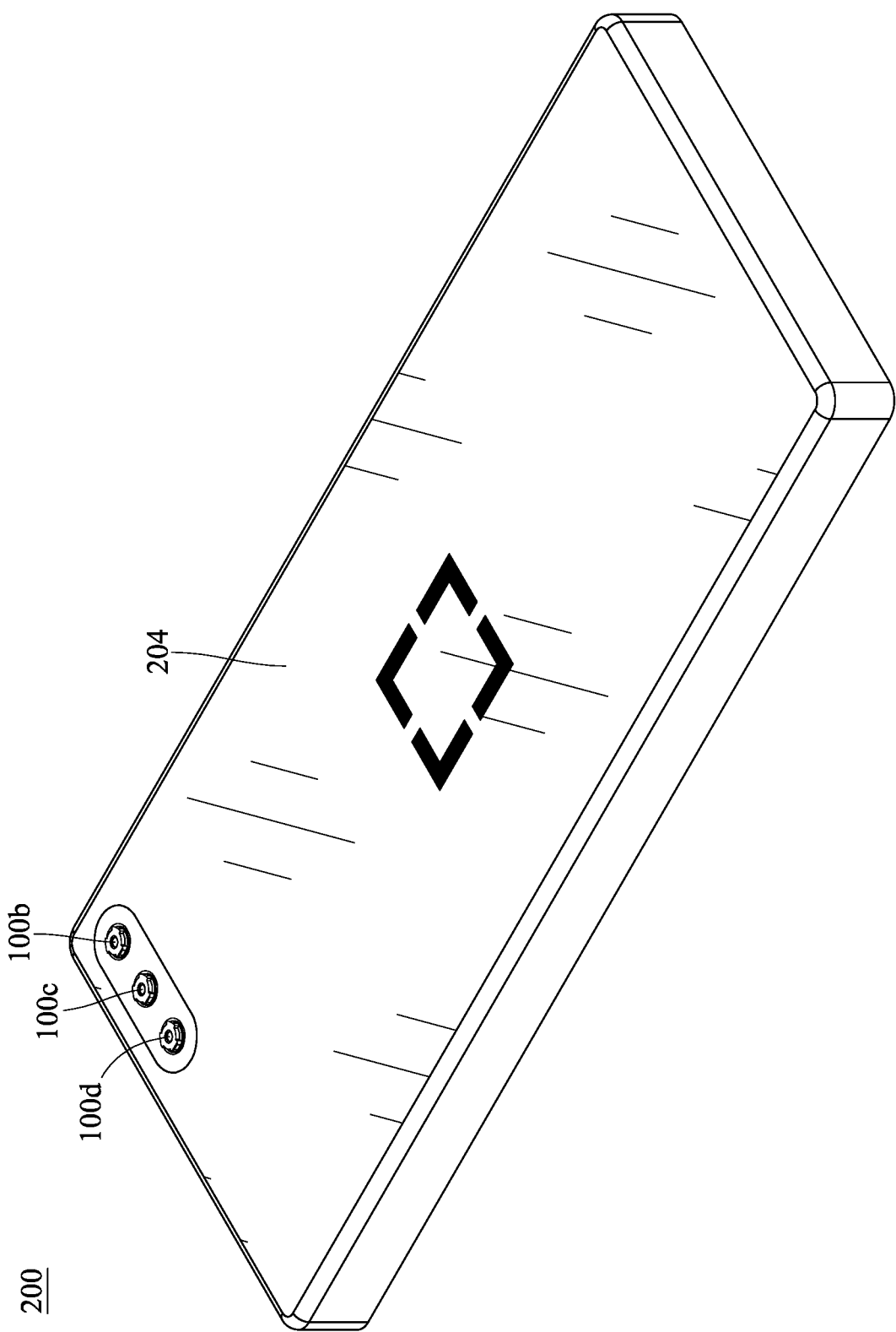
FIG. 11 is another perspective view of the electronic device in FIG. 10.
Figure 12:
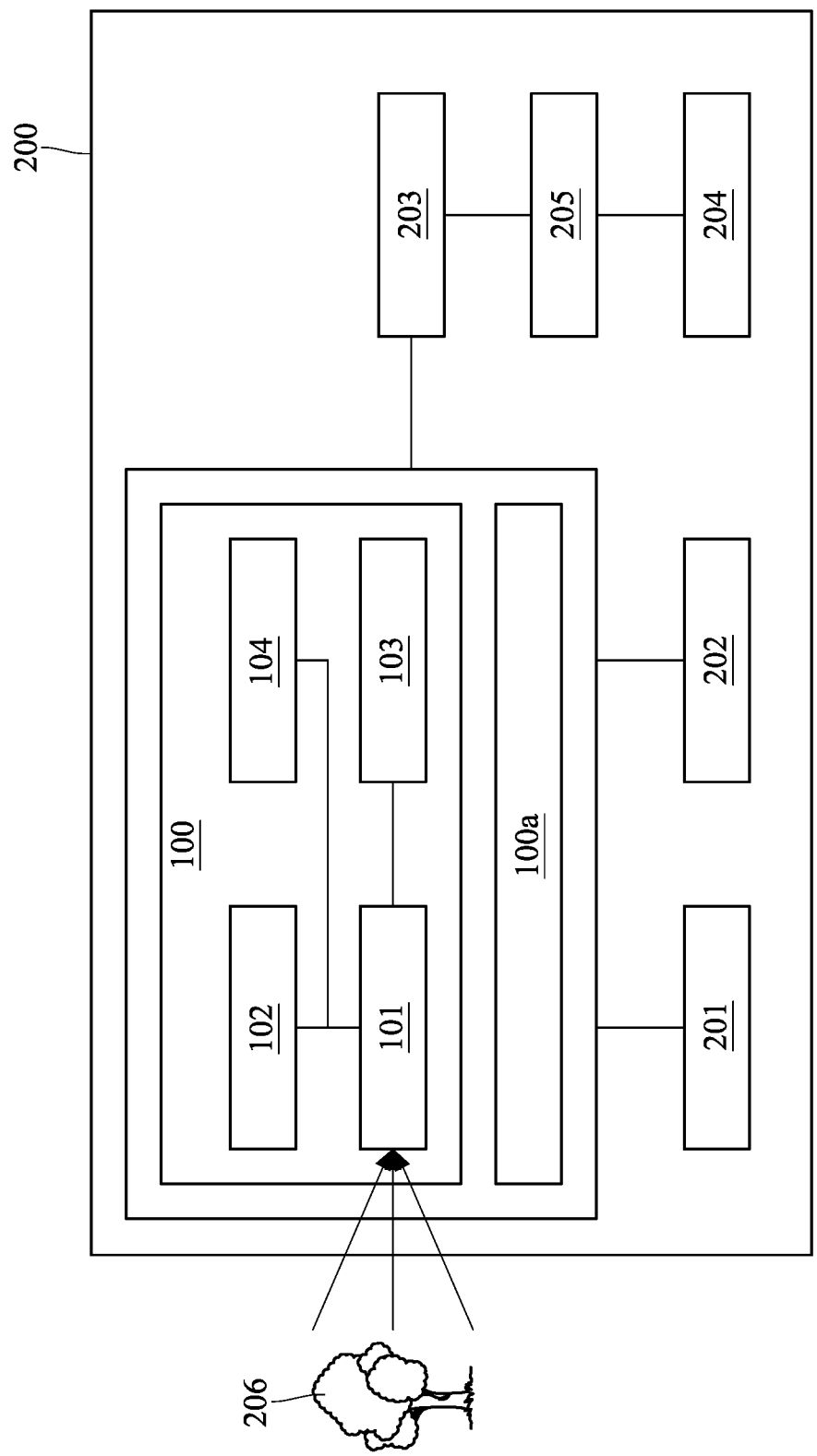
FIG. 12 is a block diagram of the electronic device in FIG. 10.

FIG. 11 is another perspective view of the electronic device in FIG. 10. FIG. 12 is a block diagram of the electronic device in FIG. 10.

In this embodiment, an electronic device 200 is a smartphone including the image capturing unit 100 disclosed in the 5th embodiment, an image capturing unit 100a, an image capturing unit 100b, an image capturing unit 100c, an image capturing unit 100d, a flash module 201, a focus assist module 202, an image signal processor 203, a display module 204 and an image software processor 205.

The image capturing unit 100 and the image capturing unit 100a are disposed on the same side of the electronic device 200 and each of the image capturing units 100 and 100a has a single focal point. The focus assist module 202 can be a laser rangefinder or a ToF (time of flight) module, but the present disclosure is not limited thereto. The image capturing unit 100b, the image capturing unit 100c, the image capturing unit 100d and the display module 204 are disposed on the opposite side of the electronic device 200, and the display module 204 can be a user interface, such that the image capturing units 100b, 100c, 100d can be front-facing cameras of the electronic device 200 for taking selfies, but the present disclosure is not limited thereto. Furthermore, each of the image capturing units 100a, 100b, 100c and 100d can include the optical imaging lens system of the present disclosure and can have a configuration similar to that of the image capturing unit 100. In detail, each of the image capturing units 100a, 100b, 100c and 100d can include a lens unit, a driving device, an image sensor and an image stabilizer, and each of the lens unit can include an optical lens assembly such as the optical imaging lens system of the present disclosure, a barrel and a holder member for holding the optical lens assembly.

The image capturing unit 100 is a wide-angle image capturing unit, the image capturing unit 100a is an ultra-wide-angle image capturing unit, the image capturing unit 100b is a wide-angle image capturing unit, the image capturing unit 100c is an ultra-wide-angle image capturing unit, and the image capturing unit 100d is a ToF image capturing unit. In this embodiment, the image capturing units 100 and 100a have different fields of view, such that the electronic device 200 can have various magnification ratios so as to meet the requirement of optical zoom functionality. In addition, the image capturing unit 100d can determine depth information of the imaged object. In this embodiment, the electronic device 200 includes multiple image capturing units 100, 100a, 100b, 100c and 100d, but the present disclosure is not limited to the number and arrangement of image capturing units.

When a user captures images of an object 206, the light rays converge in the image capturing unit 100 or the image capturing unit 100a to generate images, and the flash module 201 is activated for light supplement. The focus assist module 202 detects the object distance of the imaged object 206 to achieve fast auto focusing. The image signal processor 203 is configured to optimize the captured image to improve image quality. The light beam emitted from the focus assist module 202 can be either conventional infrared or laser. In addition, the light rays may converge in the image capturing unit 100b, 100c or 100d to generate images. The display module 204 can include a touch screen, and the user is able to interact with the display module 204 and the image software processor 205 having multiple functions to capture images and complete image processing. Alternatively, the user may capture images via a physical button. The image processed by the image software processor 205 can be displayed on the display module 204. Furthermore, the electronic device 200 captures images of different regions on the image sensor according to the operation of a user. Therefore, it is favorable for overcoming aiming problems in scenarios such as dynamic photography or telephoto photography.

7th Embodiment

Figure 13:
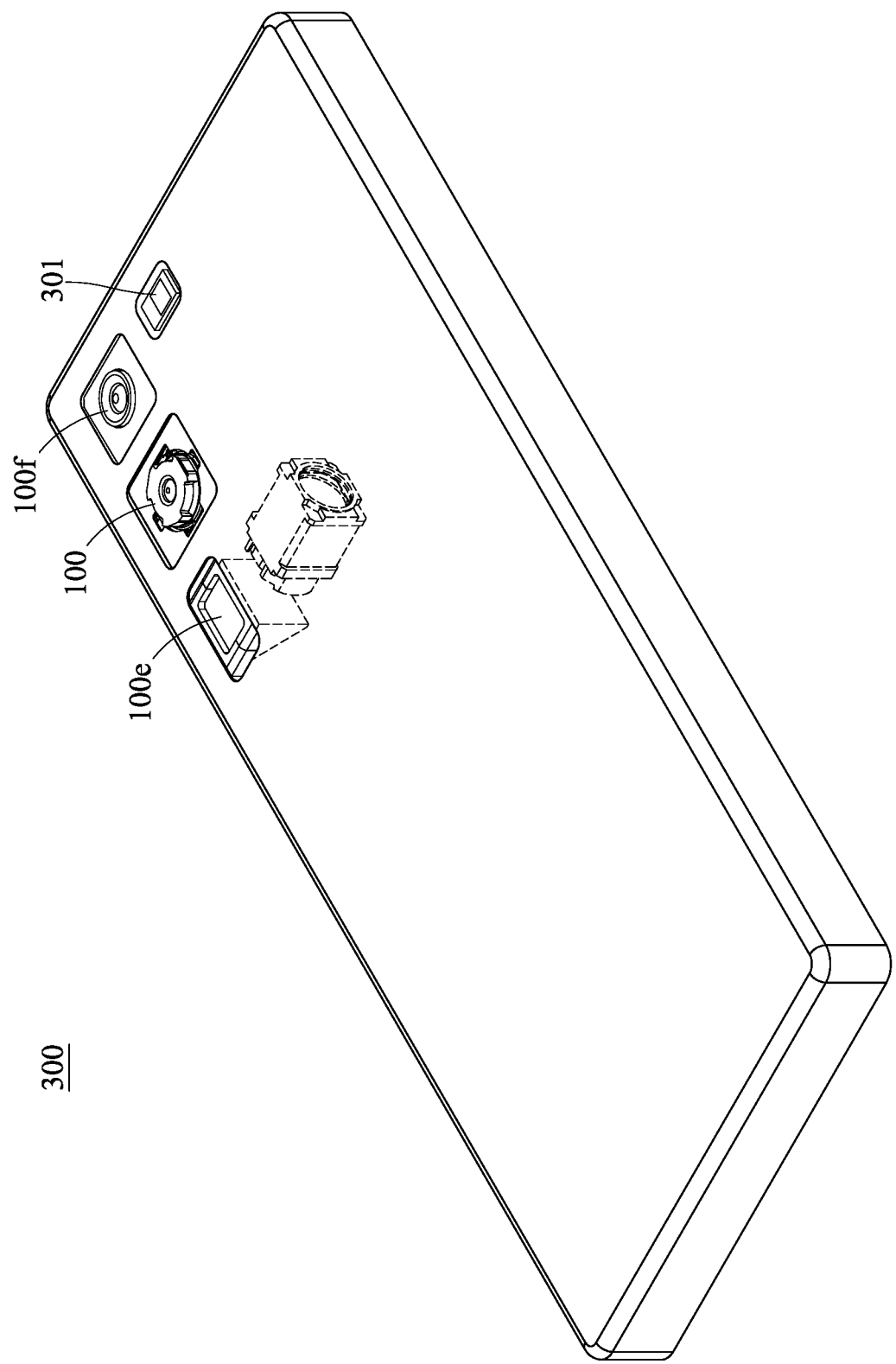
FIG. 13 is one perspective view of an electronic device according to the 7th embodiment of the present disclosure.

FIG. 13 is one perspective view of an electronic device according to the 7th embodiment of the present disclosure.

In this embodiment, an electronic device 300 is a smartphone including the image capturing unit 100 disclosed in the 5th embodiment, an image capturing unit 100*e*, an image capturing unit 100*f*, a flash module 301, a focus assist module, an image signal processor, a display module and an image software processor (not shown). The image capturing unit 100, the image capturing unit 100*e* and the image capturing unit 100*f* are disposed on the same side of the electronic device 300, while the display module is disposed on the opposite side of the electronic device 300. Furthermore, each of the image capturing units 100*e* and 100*f* can include the optical imaging lens system of the present disclosure and can have a configuration similar to that of the image capturing unit 100, and the details in this regard will not be provided again.

The image capturing unit 100 is a wide-angle image capturing unit, the image capturing unit 100*e* is a telephoto image capturing unit, and the image capturing unit 100*f* is an ultra-wide-angle image capturing unit. In this embodiment, the image capturing units 100, 100*e* and 100*f* have different fields of view, such that the electronic device 300 can have various magnification ratios so as to meet the requirement of optical zoom functionality. Moreover, the image capturing unit 100*e* can be a telephoto image capturing unit having a light-folding element configuration, such that the total track length of the image capturing unit 100*e* is not limited by the thickness of the electronic device 300. Moreover, the light-folding element configuration of the image capturing unit 100*e* can be similar to, for example, one of the structures shown in FIG. 20 to FIG. 22, which can be referred to foregoing descriptions corresponding to FIG. 20 to FIG. 22, and the details in this regard will not be provided again. In this embodiment, the electronic device 300 includes multiple image capturing units 100, 100*e* and 100*f*, but the present disclosure is not limited to the number and arrangement of image capturing units. When a user captures images of an object, light rays converge in the image capturing unit 100, 100*e* or 100*f* to generate images, and the flash module 301 is activated for light supplement. Further, the subsequent processes are performed in a manner similar to the abovementioned embodiment, so the details in this regard will not be provided again.

8th Embodiment

Figure 14:
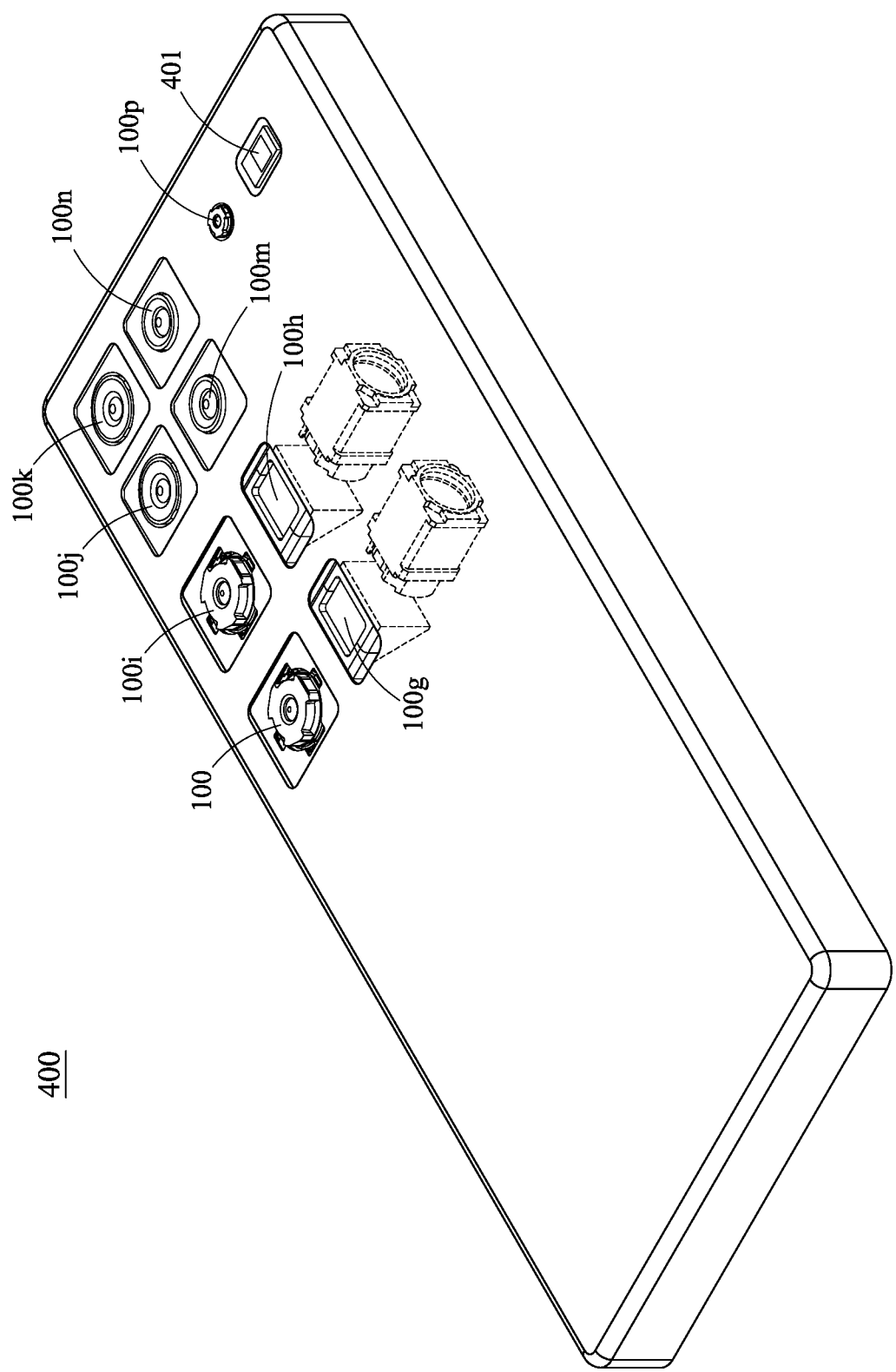
FIG. 14 is one perspective view of an electronic device according to the 8th embodiment of the present disclosure.

FIG. 14 is one perspective view of an electronic device according to the 8th embodiment of the present disclosure.

In this embodiment, an electronic device 400 is a smartphone including the image capturing unit 100 disclosed in the 5th embodiment, an image capturing unit 100*g*, an image capturing unit 100*h*, an image capturing unit 100*i*, an image capturing unit 100*j*, an image capturing unit 100*k*, an image capturing unit 100*m*, an image capturing unit 100*n*, an image capturing unit 100*p*, a flash module 401, a focus assist module, an image signal processor, a display module and an image software processor (not shown). The image capturing units 100, 100*g*, 100*h*, 100*i*, 100*j*, 100*k*, 100*m*, 100*n* and 100*p* are disposed on the same side of the electronic device 400, while the display module is disposed on the opposite side of the electronic device 400. Furthermore, each of the image capturing units 100*g*, 100*h*, 100*i*, 100*j*, 100*k*, 100*m*, 100*n* and 100*p* can include the optical imaging lens system of the present disclosure and can have a configuration similar to that of the image capturing unit 100, and the details in this regard will not be provided again.

The image capturing unit 100 is a wide-angle image capturing unit, the image capturing unit 100*g* is a telephoto image capturing unit, the image capturing unit 100*h* is a telephoto image capturing unit, the image capturing unit 100*i* is a wide-angle image capturing unit, the image capturing unit 100*j* is an ultra-wide-angle image capturing unit, the image capturing unit 100*k* is an ultra-wide-angle image capturing unit, the image capturing unit 100*m* is a telephoto image capturing unit, the image capturing unit 100*n* is a telephoto image capturing unit, and the image capturing unit 100*p* is a ToF image capturing unit. In this embodiment, the image capturing units 100, 100*g*, 100*h*, 100*i*, 100*j*, 100*k*, 100*m* and 100*n* have different fields of view, such that the electronic device 400 can have various magnification ratios so as to meet the requirement of optical zoom functionality. Moreover, each of the image capturing units 100*g* and 100*h* can be a telephoto image capturing unit having a light-folding element configuration. Moreover, the light-folding element configuration of each of the image capturing unit 100*g* and 100*h* can be similar to, for example, one of the structures shown in FIG. 20 to FIG. 22, which can be referred to foregoing descriptions corresponding to FIG. 20 to FIG. 22, and the details in this regard will not be provided again. In addition, the image capturing unit 100*p* can determine depth information of the imaged object. In this embodiment, the electronic device 400 includes multiple image capturing units 100, 100*g*, 100*h*, 100*i*, 100*j*, 100*k*, 100*m*, 100*n* and 100*p*, but the present disclosure is not limited to the number and arrangement of image capturing units. When a user captures images of an object, the light rays converge in the image capturing unit 100, 100*g*, 100*h*, 100*i*, 100*j*, 100*k*, 100*m*, 100*n* or 100*p* to generate images, and the flash module 401 is activated for light supplement. Further, the subsequent processes are performed in a manner similar to the abovementioned embodiments, and the details in this regard will not be provided again.

9th Embodiment

Figure 15:
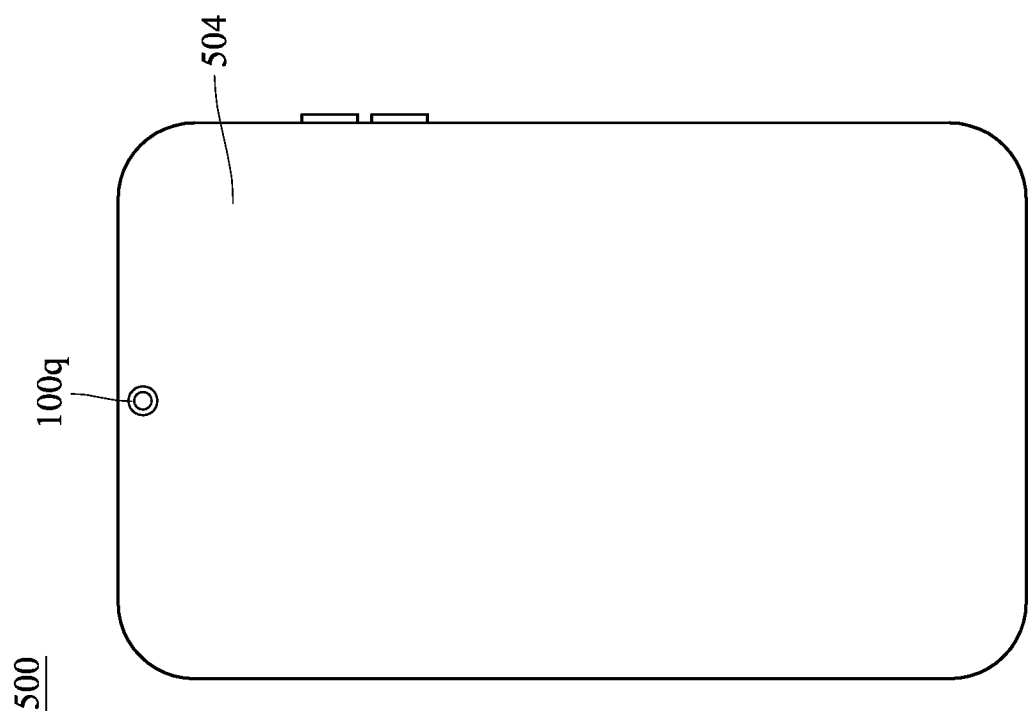
FIG. 15 is one perspective view of an electronic device according to the 9th embodiment of the present disclosure.
Figure 16:
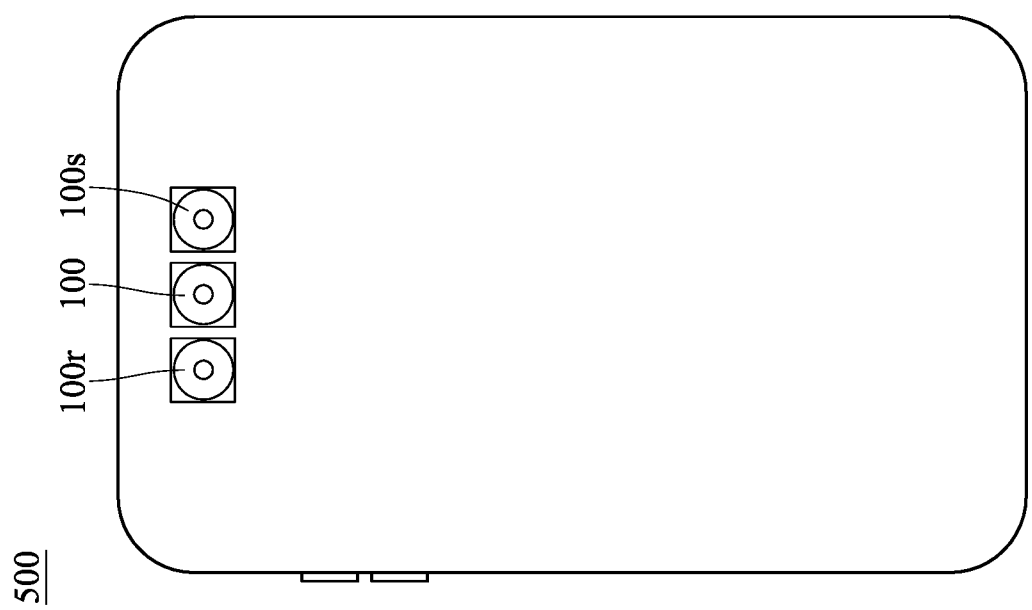
FIG. 16 is another perspective view of the electronic device in FIG. 15.

FIG. 15 is one perspective view of an electronic device according to the 9th embodiment of the present disclosure, and FIG. 16 is another perspective view of the electronic device in FIG. 15.

In this embodiment, an electronic device 500 is a smartphone including the image capturing unit 100 disclosed in the 5th embodiment, an image capturing unit 100*q*, an image capturing unit 100*r*, an image capturing unit 100*s* and a display module 504.

In this embodiment, the image capturing unit 100, the image capturing unit 100*r* and the image capturing unit 100*s* are disposed on the same side of the electronic device 500, and the image capturing unit 100*q* and the display module 504 are disposed on the opposite side of the electronic device 500. The image capturing unit 100*q* can be a front-facing camera of the electronic device 500 for taking selfies, but the present disclosure is not limited thereto. Furthermore, each of the image capturing units 100*q*, 100*r* and 100*s* can include the optical imaging lens system of the present disclosure and can have a configuration similar to that of the image capturing unit 100, and the details in this regard will not be provided again.

The image capturing unit 100 is a wide-angle image capturing unit, the image capturing unit 100r is a telephoto image capturing unit, and the image capturing unit 100s is an ultra-wide-angle image capturing unit. In this embodiment, the image capturing units 100, 100r and 100s have different fields of view, such that the electronic device 500 can have various magnification ratios so as to meet the requirement of optical zoom functionality for various applications with different requirements.

The smartphone in this embodiment is only exemplary for showing the image capturing unit of the present disclosure installed in an electronic device, and the present disclosure is not limited thereto. The image capturing unit can be optionally applied to optical systems with a movable focus. Furthermore, the optical imaging lens system of the image capturing unit features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, aerial cameras, wearable devices, portable video recorders and other electronic imaging devices.

The foregoing description, for the purpose of explanation, has been described with reference to specific embodiments. It is to be noted that TABLES 1A-4C show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens system comprising six lens elements, the six lens elements being, in order from an object side to an image side along an optical path, a first lens element, a second lens element, a third lens element, a fourth lens element, a fifth lens element and a sixth lens element, and each of the six lens elements having an object-side surface facing toward the object side and an image-side surface facing toward the image side;

wherein the first lens element has positive refractive power, the second lens element has positive refractive power, the image-side surface of the second lens element is convex in a paraxial region thereof, the object-side surface of the fourth lens element is concave in a paraxial region thereof, the image-side surface of the fourth lens element is convex in a paraxial region thereof, the image-side surface of the fifth lens element is convex in a paraxial region thereof, the sixth lens element has negative refractive power, the object-side surface of the sixth lens element is convex in a paraxial region thereof, the image-side surface of the sixth lens element is concave in a paraxial region thereof, and the image-side surface of the sixth lens element has at least one inflection point;

wherein a focal length of the first lens element is f1, a focal length of the fourth lens element is f4, a focal length of the fifth lens element is f5, an axial distance between the first lens element and the second lens element is T12, an axial distance between the fifth lens element and the sixth lens element is T56, a curvature radius of the object-side surface of the fifth lens element is R9, a curvature radius of the image-side surface of the fifth lens element is R10, and the following conditions are satisfied:

$0 \le |f1/f4| < 0.65;$ $0 \le |f5/f4| < 0.80;$ $0.70 < T12/T56 < 6.50;$ and $(R9+R10)/(R9-R10) < 2.50.$ 2. The optical imaging lens system of claim 1, wherein the object-side surface of the first lens element is convex in a paraxial region thereof, the third lens element has negative refractive power, and the fifth lens element has positive refractive power.

3. The optical imaging lens system of claim 1, wherein an Abbe number of the third lens element is V3, an Abbe number of the fourth lens element is V4, and the following condition is satisfied:

$15.0 < V3+V4 < 50.0.$

4. The optical imaging lens system of claim 1, wherein an Abbe number of the sixth lens element is V6, and the following condition is satisfied:

$30.0 < V6 < 42.0.$

5. The optical imaging lens system of claim 1, wherein an axial distance between the object-side surface of the first lens element and an image surface is TL, a maximum image height of the optical imaging lens system is ImgH, and the following condition is satisfied:

$0.50 < TL/ImgH < 1.55.$

6. The optical imaging lens system of claim 1, wherein a curvature radius of the object-side surface of the first lens element is R1, a curvature radius of the image-side surface of the first lens element is R2, and the following condition is satisfied:

$-0.80 < (R1-R2)/(R1+R2) < 0.$

7. The optical imaging lens system of claim 1, wherein a curvature radius of the object-side surface of the second lens element is R3, a curvature radius of the image-side surface of the second lens element is R4, and the following condition is satisfied:

$0.30 < (R3-R4)/(R3+R4) < 0.80.$

8. The optical imaging lens system of claim 1, wherein a focal length of the optical imaging lens system is f, the focal length of the fourth lens element is f4, and the following condition is satisfied:

$-0.50 \le f/f4 < 0.30.$

9. The optical imaging lens system of claim 1, wherein the axial distance between the first lens element and the second lens element is T12, a maximum value among central thicknesses of all lens elements of the optical imaging lens system is CTmax, and the following condition is satisfied:

$0.30 < T12/CTmax < 1.0.$

10. The optical imaging lens system of claim 1, further comprising an aperture stop, wherein an axial distance between the aperture stop and the image-side surface of the sixth lens element is SD, an axial distance between the object-side surface of the first lens element and the image-side surface of the sixth lens element is TD, and the following condition is satisfied:

$0.75 < SD/TD < 0.90.$

11. The optical imaging lens system of claim 1, wherein a displacement in parallel with an optical axis from an axial vertex of the image-side surface of the third lens element to a maximum effective radius position of the image-side surface of the third lens element is SAG32, the axial distance between the first lens element and the second lens element is T12, and the following condition is satisfied:

$-0.80 < SAG32/T12 < 0.$

12. An image capturing unit comprising:
the optical imaging lens system of claim 1; and
an image sensor disposed on an image surface of the optical imaging lens system.

13. The image capturing unit of claim 12, wherein the image sensor is substantially in a square shape.

14. An electronic device comprising:
the image capturing unit of claim 12.

15. The electronic device of claim 14, wherein the electronic device captures images of different regions on the image sensor according to an operation of a user.

16. The optical imaging lens system of claim 1,
wherein the fifth lens element has positive refractive power;
wherein the focal length of the first lens element is f1, the focal length of the fourth lens element is f4, an axial distance between the third lens element and the fourth lens element is T34, a central thickness of the second lens element is CT2, a central thickness of the fourth lens element is CT4, a central thickness of the fifth lens element is CT5, an Abbe number of the second lens element is V2, an Abbe number of the third lens element is V3, an Abbe number of the sixth lens element is V6, and the following conditions are satisfied:

$0 \leq |f1/f4| < 0.60;$ $0.60 < T34/CT2 < 5.0;$ $0.15 < (V3+V6)/V2 < 1.25;$ and $0.90 < CT5/CT4 < 2.50.$ 17. The optical imaging lens system of claim 1, wherein the image-side surface of the third lens element is concave in a paraxial region thereof.

18. The optical imaging lens system of claim 1, wherein a minimum value among Abbe numbers of all lens elements of the optical imaging lens system is Vmin, and the following condition is satisfied:

$5.0 < Vmin < 21.0.$

19. The optical imaging lens system of claim 1, further comprising an aperture stop disposed between the first lens element and the second lens element.

20. The optical imaging lens system of claim 1, wherein a curvature radius of the object-side surface of the fourth lens element is R7, a curvature radius of the image-side surface of the fourth lens element is R8, and the following condition is satisfied:

$-0.50 < (R7-R8)/(R7+R8) < 0.50.$

21. The optical imaging lens system of claim 1, wherein a vertical distance between a critical point on the image-side surface of the third lens element and an optical axis is Yc32, a focal length of the optical imaging lens system is f, and the image-side surface of the third lens element has at least one critical point in an off-axis region thereof satisfying the following condition:

$0.05 < Yc32/f < 0.80.$

22. The optical imaging lens system of claim 1, wherein an axial distance between the object-side surface of the first lens element and an image surface is TL, a focal length of the optical imaging lens system is f, an f-number of the optical imaging lens system is Fno, and the following conditions are satisfied:

$1.10 < TL/f < 1.60;$ $3.0 \text{ mm} < TL < 6.0 \text{ mm; and}$ $1.70 < Fno < 2.20.$ 23. The optical imaging lens system of claim 1, wherein half of a maximum field of view of the optical imaging lens system is HFOV, and the following condition is satisfied:

$40.0 \text{ degrees} < HFOV < 60.0 \text{ degrees}.$

24. The optical imaging lens system of claim 1, wherein a maximum value among all chief ray angles on an image surface of the optical imaging lens system is CRAmax, and the following condition is satisfied:

$35.0 \text{ degrees} < CRAmax < 50.0 \text{ degrees}.$

25. The optical imaging lens system of claim 1, wherein a maximum effective radius of the object-side surface of the first lens element is Y11, a maximum effective radius of the image-side surface of the sixth lens element is Y62, and the following condition is satisfied:

$0.10 < Y11/Y62 < 0.50.$

* * * * *